(12) United States Patent
Balasaygun et al.

(10) Patent No.: US 9,338,273 B2
(45) Date of Patent: May 10, 2016

(54) METHOD FOR TELEPHONY CLIENT SYNCHRONIZATION IN TELEPHONE VIRTUALIZATION

(75) Inventors: Mehmet C. Balasaygun, Freehold, NJ (US); John Buford, Princeton, NJ (US); Venkatesh Krishnaswamy, Holmdel, NJ (US); Xiaotao Wu, Metuchen, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1095 days.

(21) Appl. No.: 12/564,168

(22) Filed: Sep. 22, 2009

(65) Prior Publication Data

US 2011/0069699 A1   Mar. 24, 2011

(51) Int. Cl.
*H04M 1/253* (2006.01)
*H04L 29/06* (2006.01)
*G06F 9/455* (2006.01)
*H04M 1/725* (2006.01)

(52) U.S. Cl.
CPC ......... *H04M 1/2535* (2013.01); *H04L 65/1059* (2013.01); *G06F 9/45533* (2013.01); *H04M 1/72519* (2013.01)

(58) Field of Classification Search
USPC ......... 370/352, 353, 354, 401, 493, 494, 495, 370/219, 220.01, 133, 1.04, 331; 709/203, 709/247, 248, 223, 226, 220, 225
See application file for complete search history.

(56) References Cited

U.S. PATENT DOCUMENTS

| | | | |
|---|---|---|---|
| 7,439,937 B2 | 10/2008 | Ben-Shachar et al. | |
| 7,555,522 B2 | 6/2009 | Klassen et al. | |
| 2003/0074451 A1* | 4/2003 | Parker et al. | 709/227 |
| 2004/0127251 A1* | 7/2004 | Thakkar et al. | 455/552.1 |
| 2005/0138124 A1 | 6/2005 | Klassen et al. | |
| 2005/0198029 A1 | 9/2005 | Pohja et al. | |
| 2006/0252464 A1* | 11/2006 | Vander Veen et al. | 455/567 |
| 2006/0291481 A1 | 12/2006 | Kumar | |
| 2007/0088762 A1 | 4/2007 | Harris et al. | |
| 2007/0168953 A1 | 7/2007 | Diez et al. | |
| 2007/0171921 A1* | 7/2007 | Wookey et al. | 370/401 |
| 2007/0189520 A1* | 8/2007 | Altberg et al. | 380/30 |
| 2008/0005239 A1 | 1/2008 | Podl | |
| 2008/0318616 A1* | 12/2008 | Chipalkatti et al. | 455/550.1 |
| 2009/0036111 A1* | 2/2009 | Danford et al. | 455/419 |
| 2009/0059965 A1 | 3/2009 | Lin et al. | |
| 2009/0187854 A1 | 7/2009 | Murtagh | |
| 2009/0249332 A1 | 10/2009 | Hoehle et al. | |

(Continued)

OTHER PUBLICATIONS

General Purpose Hardware Abstraction Layer for Multiple Virtual Machine in Mobile Devices, Lee, Sang-Main, Feb. 15-18, 2009, IEEE, ICACT 2009.*

*Primary Examiner* — Khaled Kassim
(74) *Attorney, Agent, or Firm* — Sheridan Ross P.C.

(57) ABSTRACT

A method is provided for the use of a signaling protocol stack by telephony applications which run on different system software images. When a telecommunications session is conducted by a first telephony application, the first telephony application typically controls the state of the telecommunications session through a signaling protocol stack executing on the same system software image as the first telephony application. When control over the telecommunications session is passed from the first telephony application to a second telephony application, the second telephony applications begins controlling the state of the telecommunications session through the same signaling protocol stack by using remote procedure calls.

17 Claims, 16 Drawing Sheets

(56) References Cited

U.S. PATENT DOCUMENTS

| | | |
|---|---|---|
| 2010/0017482 A1 | 1/2010 | Piccinini et al. |
| 2010/0074155 A1* | 3/2010 | Park et al. ............ 370/310 |
| 2010/0131625 A1 | 5/2010 | Dehaan et al. |
| 2010/0211769 A1* | 8/2010 | Shankar et al. ............ 713/2 |
| 2010/0235523 A1* | 9/2010 | Garcia et al. ............ 709/228 |
| 2010/0241483 A1 | 9/2010 | Haynes et al. |
| 2010/0330961 A1 | 12/2010 | Rogel |
| 2011/0003585 A1* | 1/2011 | Wang et al. ............ 455/418 |
| 2011/0098089 A1* | 4/2011 | Irie et al. ............ 455/566 |

\* cited by examiner

METHOD FOR TELEPHONY CLIENT SYNCHRONIZATION IN TELEPHONE VIRTUALIZATION

FIELD OF THE INVENTION

The present invention relates to telecommunications in general, and, more particularly, to telephony applications.

BACKGROUND OF THE INVENTION

Telephone receivers differ in their features. Some manufacturers produce telephones suited for business users that provide robust productivity applications, such as conference schedulers and email clients. Other manufacturers make telephones suited for entertainment that come with entertainment applications, such as video games. When a user wants to buy a telephone receiver, he or she has to choose between having either the productivity applications provided by one manufacturer or the entertainment applications provided by another.

The need to make such choice can be avoided by using hardware virtualization. Both the operating system of the business telephone and the operating system of the entertainment telephone can execute on the same device concurrently, if hardware virtualization is used. This way, when at work, the user can access the productivity applications needed for his or her work on the "business operating system." And when at home, the user can use the entertainment applications running on the "entertainment operating system."

However, a significant drawback of present virtualization techniques is that virtualized telephone receivers cannot switch between operating systems seamlessly. If the user receives a business-related call at home, the user will not be able to answer the call and then switch to the business operating system without terminating the call first. The connection has to be terminated because, in general, virtualized operating systems running in a virtualized environment are isolated from each other.

In order for the telephony application executing on the business operating system to be able to take control over the telephone call, it needs at least some information about the phone call state, such as identity of the far-end party, media type used for the phone call (e.g. video, voice, etc.), and so forth. This information, while readily accessible from the entertainment operating system, is not accessible from the business operating system because the two operating systems are isolated. So, the telephony application executing on the business operating system cannot access the needed state information and it cannot take control over the phone call.

Therefore, a need exists for a method that would allow the sharing of information about the state of a telecommunications session across a plurality of system software images running on the same device.

SUMMARY OF THE INVENTION

The present invention addresses this need by providing a method for the use of a signaling protocol stack by telephony applications which run on different system software images. When a telecommunications session is conducted by a first telephony application, the first telephony application typically controls the state of the telecommunications session through a signaling protocol stack executing on the same system software image as the first telephony application (or on a virtualization layer).

In accordance with one embodiment of the present invention, when control over the telecommunications session is passed from the first telephony application to a second telephony application, the second telephony applications begins controlling the state of the telecommunications session through the same signaling protocol stack by using remote procedure calls. Under this arrangement, the need to synchronize the state of multiple signaling protocol stacks is avoided because only one signaling stack is used by the two applications.

In another embodiment of the present invention, when control over a telecommunications session is passed to a second telephony application, the second telephony application uses a second signaling protocol stack to control the state of the telecommunications session. The state second signaling protocol stack is synchronized with the state of the signaling protocol stack through remote procedure calls, or another type of communication that is carried over a telecommunications network. Under this arrangement, the number of remote procedure calls made by the second telephony application is reduced.

The following disclosure teaches examples of the embodiments and their operation.

DETAILED DESCRIPTION

Figure 1:
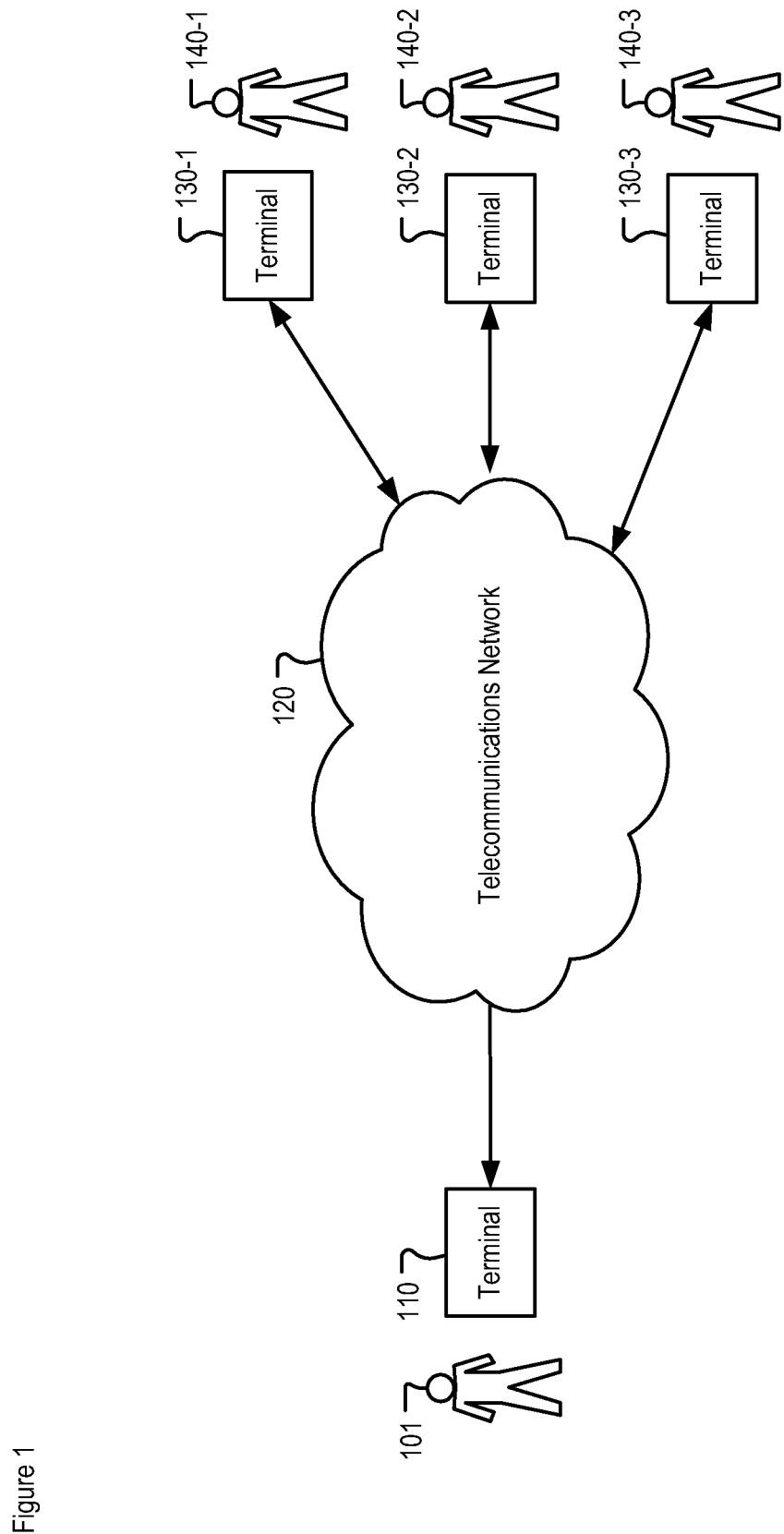
FIG. 1 depicts a schematic diagram of the salient components of the illustrative embodiment of the present invention.

FIG. 1 depicts a schematic diagram of the salient components of the illustrative embodiment of the present invention.

The illustrative embodiment comprises user 101, user 140-$i$, wherein $i \in \{1, 2, 3\}$, terminal 110, telecommunications network 120, and terminal 130-$i$.

User 101 is a natural person using terminal 110 in a well known fashion.

Terminal 110 is a desk set telephone receiver capable of running two or more operating systems in a virtualized fashion. In accordance with the illustrative embodiment of the present invention, terminal 110 is capable of both voice and video telecommunications, but it will be clear to those skilled in the art, after reading this disclosure, how to make and use alternative embodiments of the present invention in which terminal 110 has only a voice capability. Furthermore, it will be clear to those skilled in the art, after reading this disclosure, how to make and use alternative embodiments of the present invention in which terminal 110 is another type of telecommunications device (e.g. cellular telephone, 2-way radio, portable digital assistant, soft phone, etc.).

Telecommunications network 120 transports signals between terminal 110 and terminals 130-$i$. In accordance with the illustrative embodiment of the present invention, telecommunications network 120 is the Internet, but it will be clear to those skilled in the art, after reading this disclosure, how to make and use alternative embodiments of the present invention in which telecommunications network 120 is any type of telecommunications network (e.g. local area network, the Public Switched Telephone Network, SONET, ATM, cellular network, etc.).

Terminal 130-$i$ is a telephone receiver capable of conducting telecommunications sessions with terminal 110. In accordance with the illustrative embodiment of the present invention, terminal 110 is capable of conducting both audio and video telephone calls, but it will be clear to those skilled in the art, after reading this disclosure, how to make and use alternative embodiments of the present invention in which terminal 110 has only a voice capability. Furthermore, it will be clear to those skilled in the art, after reading this disclosure, how to make and use alternative embodiments of the present invention in which terminal 110 is another type of telecommunications device (e.g. cellular telephone, 2-way radio, portable digital assistant, soft phone, desktop computer, etc.).

User 140-$i$ is a natural person using terminal 130-$i$ in a well known fashion.

Figure 2:
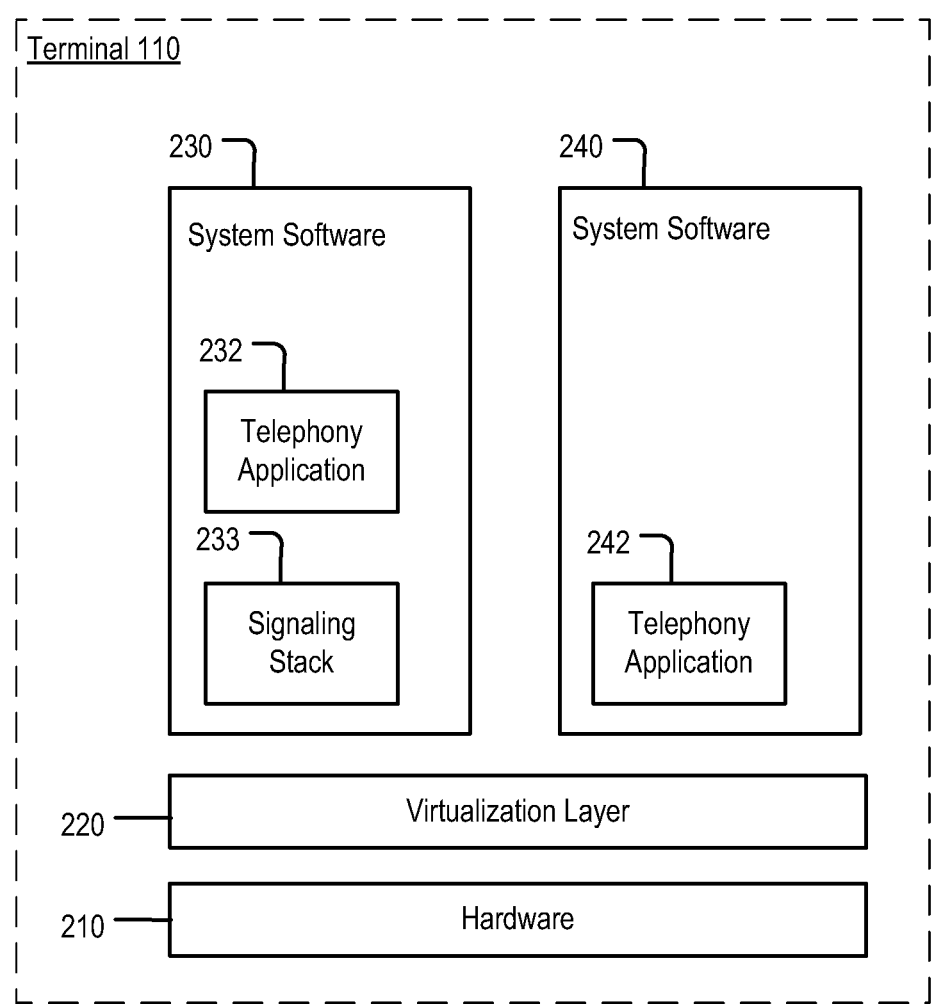
FIG. 2 depicts a schematic diagram of the salient components of the illustrative embodiment of the present invention.

FIG. 2 depicts a schematic diagram of the salient components of the illustrative embodiment of the present invention. The illustrative embodiment comprises system software 230, system software 240, virtualization layer 220, hardware 210, telephony application 232, telephony application 242, and signaling protocol stack 233.

Hardware 210 is the electronic components that comprise terminal 110, such as, for example, and without limitation, processor (single-core or multi-core), memory, transceiver, network interface, display, sound interface, video interface, etc. Hardware 210 is capable of executing system software and one or more telephony applications. It will be clear to those skilled in the art how to make and use hardware 210.

Virtualization layer 220 is a software layer that facilitates the sharing of the resources of hardware 210 by multiple system software images. In accordance with the illustrative embodiment of the present invention, virtualization layer 220 is an OKL4 micro kernel, but it will be clear to those skilled in the art, after reading this disclosure, how to make and use alternative embodiments of the present invention in which virtualization layer 220 is any other Type 1 hypervisor (e.g. Xen™, VMware ESX Server™, etc.) or any other hosted virtual machine (e.g. QEMU™, VMware Workstation™, etc.).

System software 230 is an image of the Android™ operating system that is running on top of virtualization layer 220. It will be clear to those skilled in the art, after reading this disclosure, how to make and use alternative embodiments of the present invention in which System software 230 is any type of system software, firmware, or software platform that is capable of executing one or more software applications, such as, for example, and without limitation, Nokia Series 40 Platform™, Nokia Series 60 Platform™, Embedded Linux, Symbian OS™, Linux, BlackBerry OS™, etc. In accordance with the illustrative embodiment of the present invention, both telephony application 232 and signaling protocol stack 233 are executing on system software 230.

Signaling protocol stack 233 is a Session Initiation Protocol (SIP) stack. Signaling protocol stack 233 provides telephony applications 232 and 242 with an application programming interface (API) for the creating, transmitting, and receiving of Session Initiation Protocol (SIP) messages. Moreover, signaling protocol stack 233 is also capable of maintaining records of information about the state of a telecommunications session, such as, for example, and without limitation, callback function (or listener) registration, far-end party addresses, application identification numbers, etc.

Although, in accordance with the illustrative embodiment of the present invention, signaling protocol stack 233 uses the Session Initiation Protocol (SIP), it will be clear to those skilled in the art, after reading this disclosure, how to make and use alternative embodiments of the present invention in which signaling protocol stack 233 uses any other communications protocol, such as, for example, and without limitation, H.323, P2P-SIP, Skype™, and others. Furthermore, it will be clear to those skilled in the art, after reading this disclosure, how to make and use alternative embodiments of the present invention in which signaling protocol stack 233 is executing on another entity, such as, for example, and without limitation, system software 240, virtualization layer 220, or system software that is host to virtualization layer 220.

Telephony application 232 is a software application for conducting telephone conversations. Telephony application 232 is capable of reading and processing messages received from signaling protocol stack 233, reading and processing data structures and variables indicated by the messages, as well as executing callback functions identified by the messages. It will be clear to those skilled in the art, after reading this disclosure, how to make and use alternative embodiments of the present invention in which telephony application 232 is any type of telecommunications application (e.g. instant messenger, video phone, audio enabled instant messenger, Skype™, Google Talk™, Yahoo Instant Messenger™, etc.).

System software 240 is an image of the Symbian™ operating system that is running on top of virtualization layer 220 concurrently with system software 230. It will be clear to those skilled in the art, after reading this disclosure, how to make and use alternative embodiments of the present invention in which system software 230 is any type of system software, firmware, or software platform that is capable of executing one or more software applications, such as, for example, and without limitation, Nokia Series 40 Platform™, Nokia Series 60 Platform™, Symbian OS™, Linux, BlackBerry OS™, etc. In accordance with the illustrative embodiment of the present invention, telephony application 242 is executing on system software 240.

Telephony application 242 is a software application for conducting telephone conversations. Telephony application 242 is capable of reading and processing messages sent by the signaling protocol stack 233, reading and processing data structures and variables indicated by the messages, as well as executing callback functions identified by the messages. In accordance with the illustrative embodiment of the present invention, telephony application 242 is different software from telephony application 232; however, it will be clear to those skilled in the art, after reading this disclosure, how to make and use alternative embodiments of the present invention, in which telephony applications 232 and 242 are different instances of the same software. It will be clear to those skilled in the art, after reading this disclosure, how to make and use alternative embodiments of the present invention in which telephony application 242 is any type of telecommunications application (e.g. instant messenger, video phone, audio enabled instant messenger, Skype™, Google Talk™, Yahoo Instant Messenger™, etc.).

Figure 3:
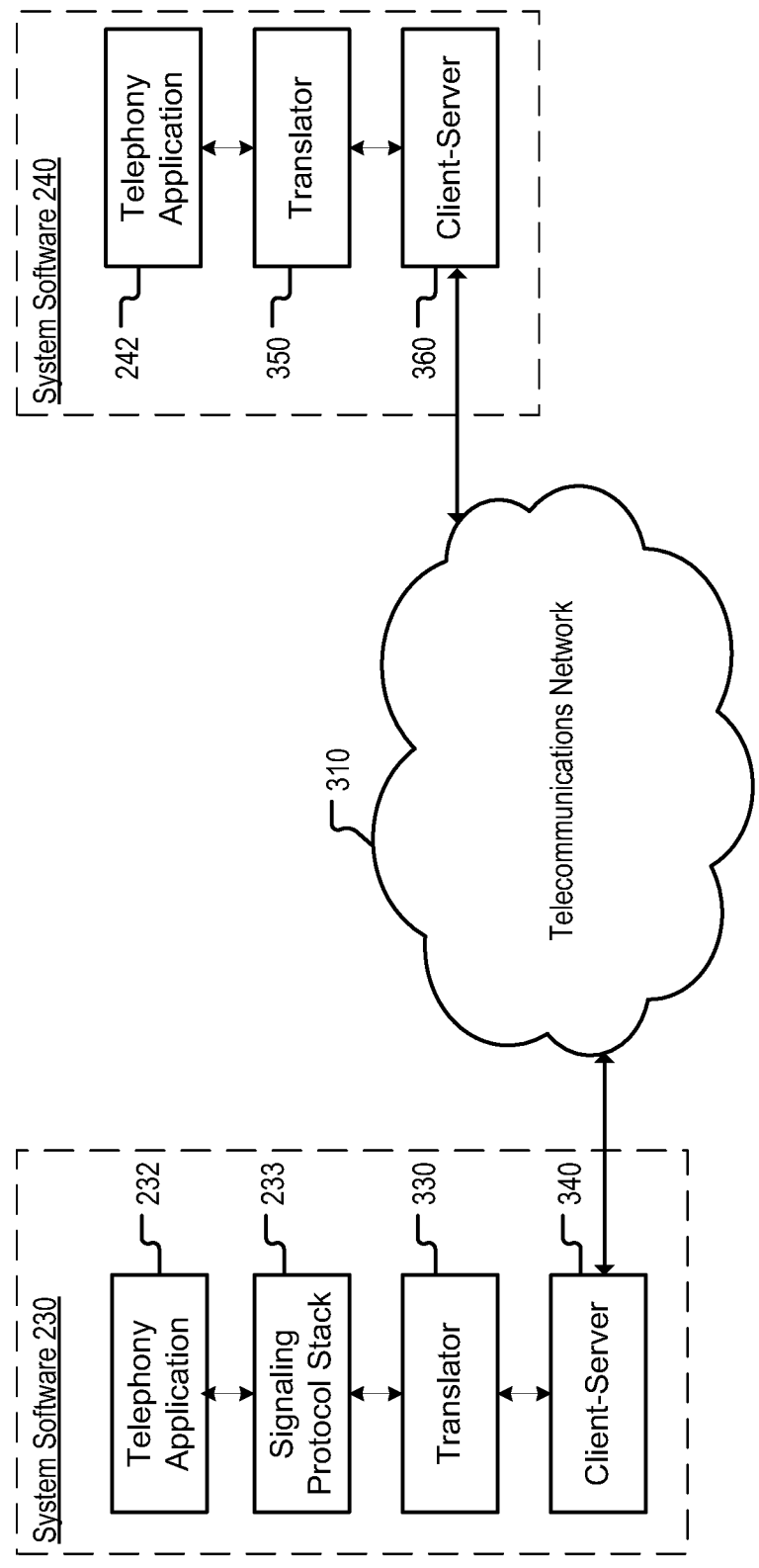
FIG. 3 depicts a schematic diagram of the salient components of the illustrative embodiment of the present invention.

FIG. 3 depicts a schematic diagram of the salient components of the illustrative embodiment of the present invention. The illustrative embodiment comprises, telephony application 232, signaling protocol stack 233, translator 330, client-server 340, telephony application 242, translator 350, client-server 360, and telecommunications network 310.

Translator 330 is a software module that acts as an adapter between telephony application 242 and signaling protocol stack 233. The use and operation of translator 330 is further described in the discussion with respect to FIG. 7.

Client-server 340 is a software module that sends and receives messages over telecommunications network 310.

Translator 350 is a software module that acts as an adapter between telephony application 242 and client-server 350. The use and operation of translator 350 is further described in the discussion with respect to FIG. 7.

Client-server 360 is a software module that sends and receives messages over telecommunications network 310.

Telecommunications network 310 transports messages between client-server 340 and client-server 360. In accordance with the illustrative embodiment of the present invention, telecommunications network 310 is the Internet, but it will be clear to those skilled in the art, after reading this disclosure, how to make and use alternative embodiments of the present invention in which telecommunications network 310 is any type of telecommunications network (e.g. local area network, the Public Switched Telephone Network, SONET, ATM, cellular network, etc.) Furthermore, in accordance with the illustrative embodiment of the present invention, telecommunications network 310 is the same entity as telecommunications network 120, but it will be clear to those skilled in the art, after reading this disclosure, how to make and use alternative embodiments of the present invention in which telecommunications network 310 and telecommunications network 120 are different entities.

Figure 4:
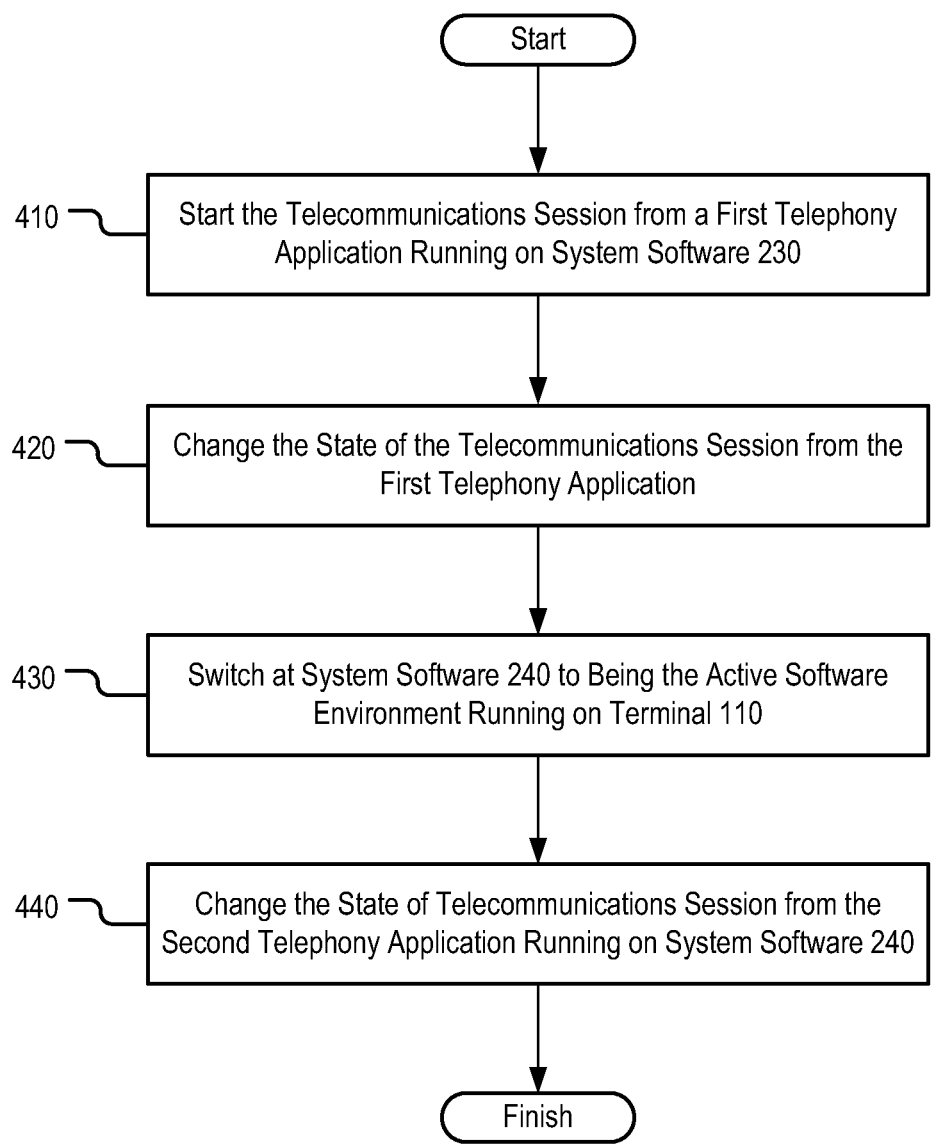
FIG. 4 depicts a flowchart of the execution of the salient tasks associated with the operation of the illustrative embodiment of the present invention.

FIG. 4 depicts a flowchart of the execution of the salient tasks associated with the operation of the illustrative embodiment of the present invention. It will be clear to those skilled in the art, after reading this disclosure, how to perform the tasks associated with FIG. 4 in a different order than represented or to perform one or more of the tasks concurrently. Furthermore, it will be clear to those skilled in the art, after reading this disclosure, how to make and use alternative embodiments of the present invention that omit one or more of the tasks.

At task 410, telephony application 232 initiates a telecommunications session with user 140-3. Task 410 is further described in the discussion with respect to FIG. 5.

At task 420, telephony application 232 changes the state of the telecommunications session initiated at task 410. In accordance with the illustrative embodiment of the present invention, telephony application 232 joins user 140-1 to the telecommunications session. The change of state is effectuated through the direct execution of one or more routines provided by signaling protocol stack 233 application programming interface (API). Those skilled in the art will recognize, after reading this disclosure, how to make and use alternative embodiments of the present invention in which the change of state is any change of state permitted by the telecommunications protocol used for the telecommunications session.

At task 430, telecommunications terminal 110 switches to running system software 240 as its active software environment. When system software 240 is made the active software environment, its user interface becomes visible on the display of terminal 110. Furthermore, those skilled in the art will recognize, after reading this disclosure, that in situations in which virtualization layer 220 runs on top of a native operating system, system software 240 will be an application executing in the native operating system instead of a separate software environment. Correspondingly, it will be clear to those skilled in the art, after reading this disclosure, how to make and use alternative embodiments of the present invention in which, at task 230, telecommunications terminal 110 makes system software 240 the active window that is open in the native operating system.

At task 440, telephony application 242 changes the state of the telecommunications session. In accordance with the illustrative embodiment of the present invention, telephony application 242 joins user 140-2 to the telecommunications session, but it will be clear to those skilled in the art, after reading this disclosure, how to make and use alternative embodiments of the present invention in which the change of the state is any change of state permitted by the telecommunications protocol used. The execution of task 440 is further described in the discussion with respect to FIG. 6.

Figure 5:
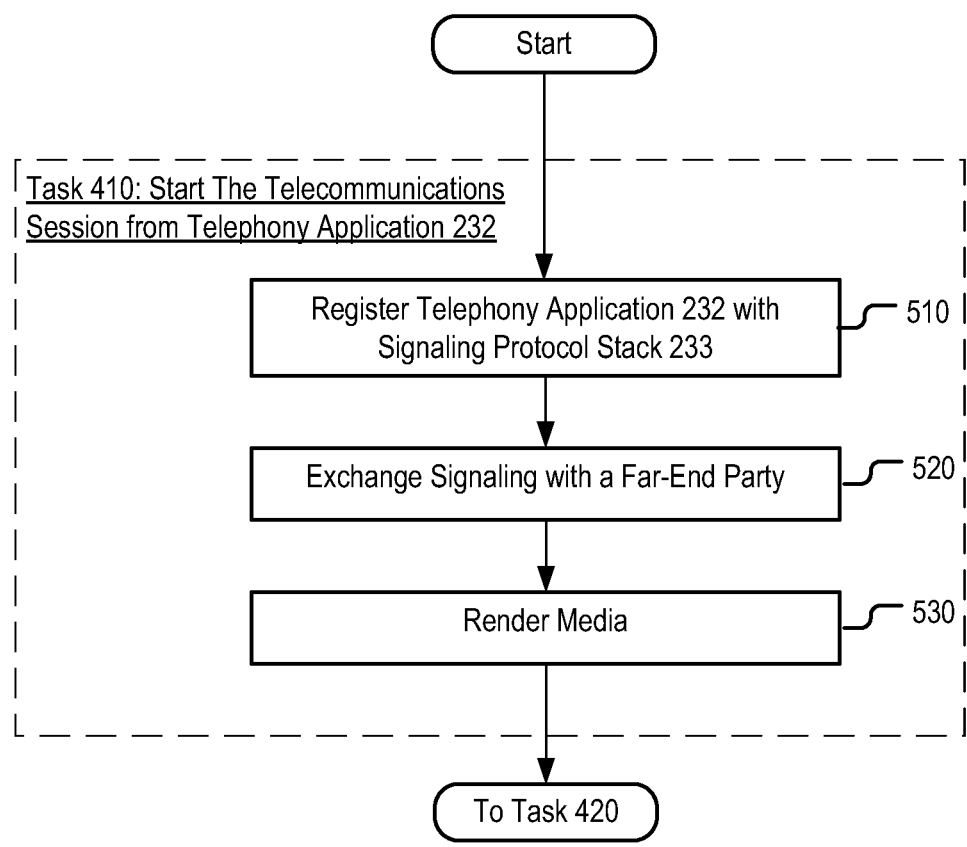
FIG. 5 depicts a flowchart of the execution of the salient subtasks associated with the performance of task 420.

FIG. 5 depicts a flowchart of the execution of the salient subtasks associated with the performance of task 410. It will be clear to those skilled in the art, after reading this disclosure, how to perform the tasks associated with FIG. 5 in a different order than represented or to perform one or more of the tasks concurrently. Furthermore, it will be clear to those skilled in the art, after reading this disclosure, how to make and use alternative embodiments of the present invention that omit one or more of the tasks.

At task 510, telephony application 232 registers with signaling protocol stack 233 by calling one or more of the routines provided by the signaling protocol stack 233 application programming interface (API). In accordance with the illustrative embodiment of the present invention, telephony application 232 submits an application identification and/or identification of at least one callback function. However, it will be clear to those skilled in the art, after reading this disclosure, how to make and use alternative embodiments of the present invention in which additional information is submitted, such as, for example, and without limitation information concerning the media capabilities of telephony application 232 (e.g. voice, text, video, etc.), type of connection, protocols supported, etc.

In accordance with the illustrative embodiment of the present invention, telephony application 232 executes the routines provided by the signaling protocol stack 233 application programming interface (API) directly. However, it will be clear to those skilled in the art, after reading this disclosure, how to make and use alternative embodiments of the present invention in which telephony application 232 executes the routines provided by the signaling protocol stack 233 application programming interface (API) by using a remote procedure calling arrangement, such as the one described in the discussion with respect to FIG. 7. Furthermore, it will be clear to those skilled in the art, after reading this disclosure, how to make and use alternative embodiments of the present invention in which another type of interprocess communication between telephony application 232 and signaling protocol stack 233 is used, such as, for example, and without limitation, writing to a shared file, writing to shared memory, etc.

At task 520, signaling protocol stack 233 transmits and receives, over telecommunications network 120, the Session Initiation Protocol (SIP) signaling necessary change the state of the telecommunications session. It will be clear to those skilled in the art how to execute task 520.

At task 530, the telephone call media is encoded, decoded, and reproduced. In accordance with the illustrative embodiment of the present invention, hardware 210 detects that incoming voice packets are received from network 120. The received packets are placed in a buffer and decoded into raw audio data. The raw audio data is sent to the audio interface of terminal 110 for reproduction. In accordance with the illustrative embodiment of the present invention, the media decoding is accomplished by hardware 210, but it will be clear to those skilled in the art, after reading this disclosure, how to make and use alternative embodiments of the present invention in which the encoding is performed by a coder-decoder program (a.k.a. codec) located in a higher software layer, such as, for example, and without limitation, virtualization layer 220 and system software 230. Furthermore, it will be clear to those skilled in the art, after reading this disclosure, how to make and use alternative embodiments of the present invention in which the encoding is performed by telephony application 232.

Figure 6:
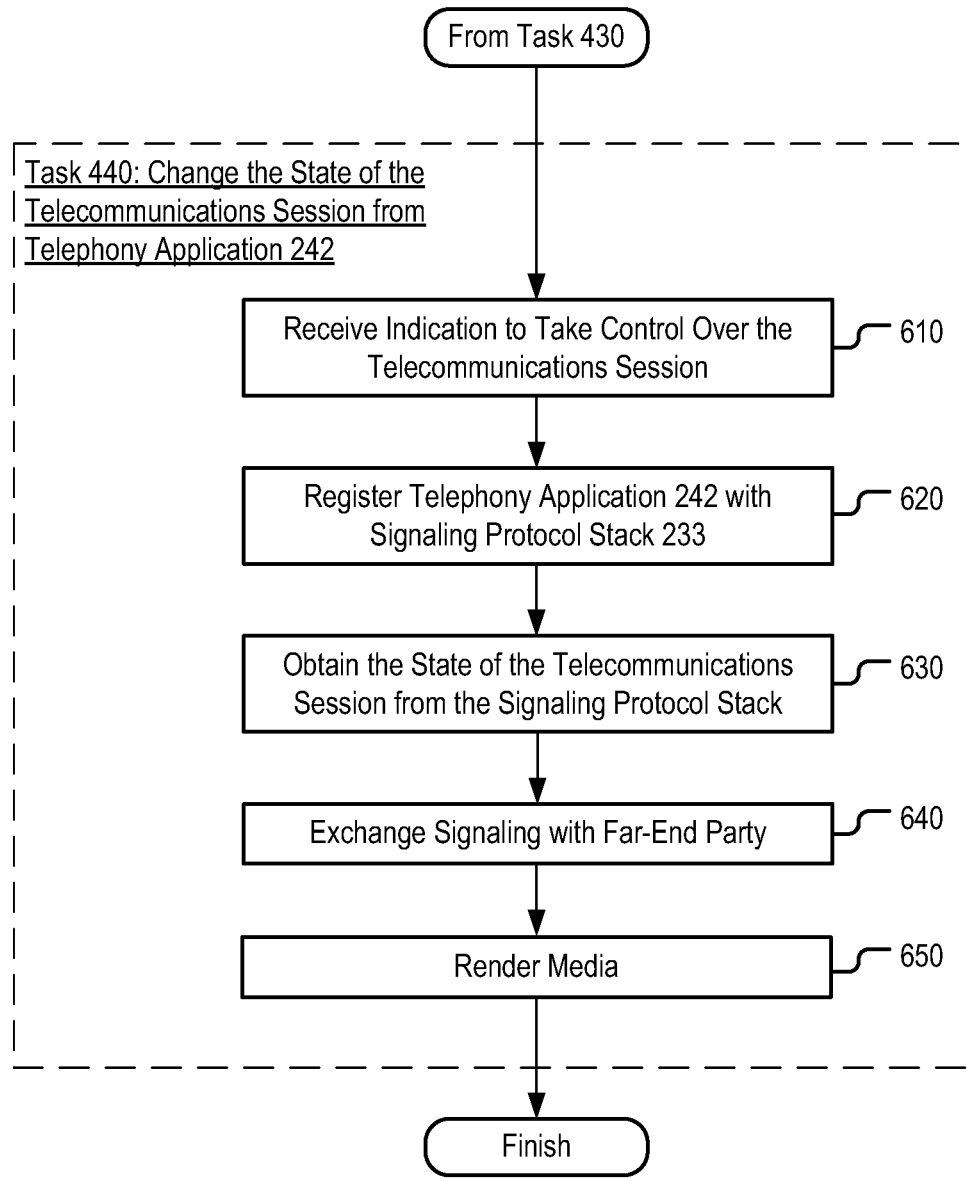
FIG. 6 depicts a flowchart of the execution of the salient subtasks associated with the performance of task 440.

FIG. 6 depicts a flowchart of the execution of the salient subtasks associated with the performance of task 440. It will be clear to those skilled in the art, after reading this disclosure, how to perform the tasks associated with FIG. 6 in a different order than represented or to perform one or more of the tasks concurrently. Furthermore, it will be clear to those skilled in the art, after reading this disclosure, how to make and use alternative embodiments of the present invention that omit one or more of the tasks.

At task 610, telephony application 233 receives an indication to take control over the telecommunications session. In accordance with the illustrative embodiment of the present invention, the indication is transmitted by system software 232, but it will be clear to those skilled in the art, after reading this disclosure, how to make and use alternative embodiments of the present invention in which the indication is transmitted by another component (e.g. telephony application 242, hardware 210, or virtualization layer 210, etc.). Furthermore, it will be clear to those skilled in the art, after reading this disclosure, how to make and use alternative embodiments of the present invention in which the indication is generated in response to the pressing of a button (either a physical switch or a graphical user interface component).

At task 620, telephony application 242 registers with signaling protocol stack 233 by remotely executing one or more of the routines provided by the signaling protocol stack 233 application programming interface (API). In accordance with the illustrative embodiment of the present invention, telephony application 242 submits application identification and/or identification of a callback function. However, it will be clear to those skilled in the art, after reading this disclosure, how to make and use alternative embodiments of the present invention in which additional information is submitted, such as, for example, and without limitation, information concerning the media capabilities of telephony application 242 (e.g. voice, text, video, etc.), type of connection, protocols supported, etc.

Figure 7:
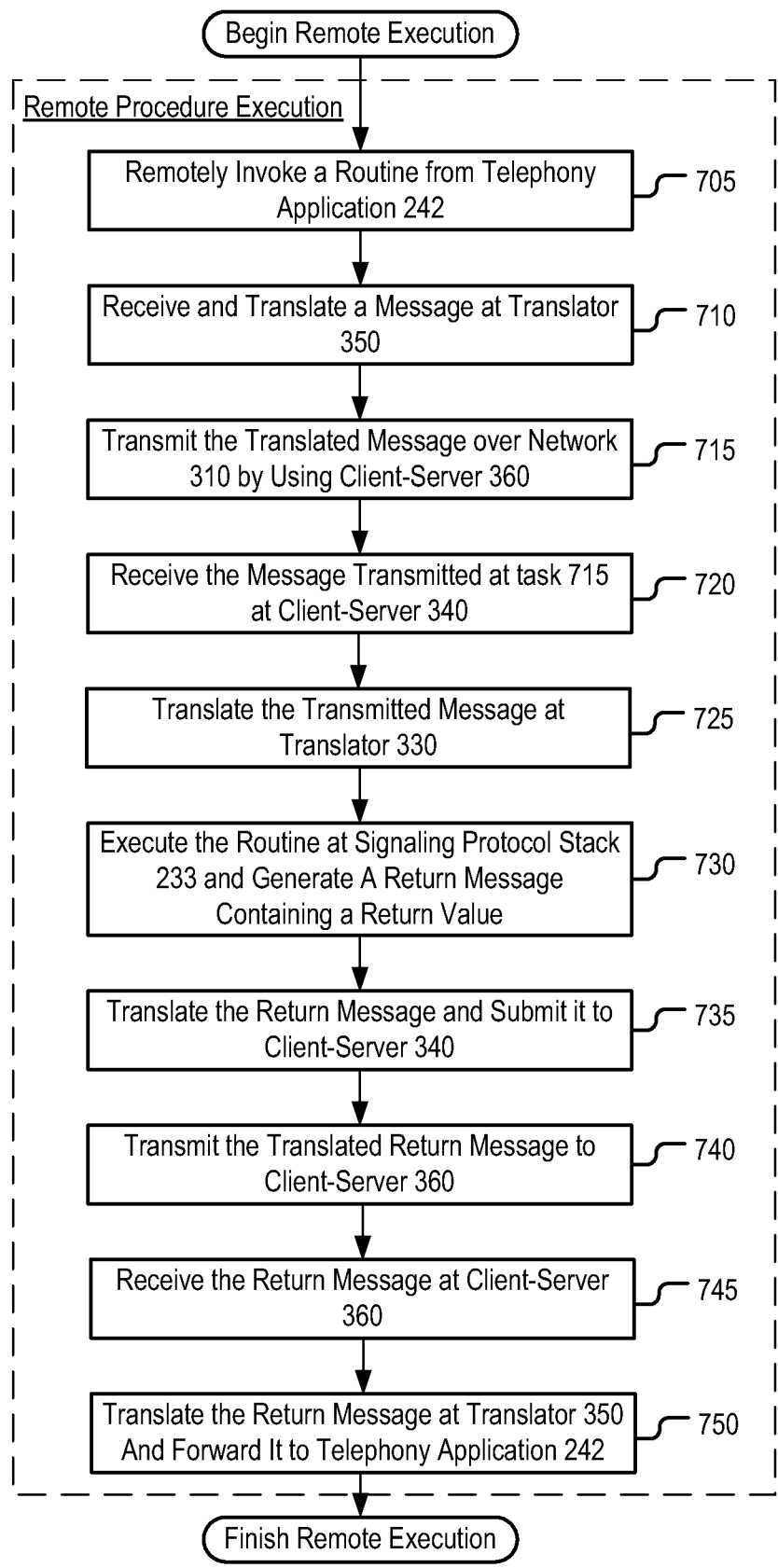
FIG. 7 depicts a flowchart of the execution of the salient tasks involved in the remote execution of routines provided by the signaling protocol stack application programming interfaces.

In accordance with the illustrative embodiment of the present invention, telephony application 242 executes the routines provided by the signaling protocol stack 233 application programming interface (API) by using a remote procedure calling arrangement, such as the one described in the discussion with respect to FIG. 7. However, it will be clear to those skilled in the art, after reading this disclosure, how to make and use alternative embodiments of the present invention in which another type of interprocess communication between telephony application 242 and signaling protocol stack 233 is used, such as, for example, and without limitation, writing to a shared file, writing to shared memory, etc.

At task 630, telephony application 242 retrieves state information for the telecommunications session by remotely executing one or more of the routines provided by the signaling protocol stack 233 application programming interface (API). In accordance with the illustrative embodiment of the present invention, the state information comprises far-end party identification, media type of the telecommunications session (e.g. voice, video, etc.), names of call-back functions registered with signaling protocol stack 233, etc. However, it will be clear to those skilled in the art, after reading this disclosure, how to make and use alternative embodiments of the present invention in which the state information comprises any item of information related to the telecommunications session, such as, for example, and without limitation, media capabilities of a far-end party (e.g. voice, video, text, etc.), authentication information (e.g. login name, password, type of encryption method used, etc.), personal information of a far-end party, etc.

In accordance with the illustrative embodiment of the present invention, telephony application 242 executes the routines provided by the signaling protocol stack 233 application programming interface (API) by using a remote procedure calling arrangement, such as the one described in the discussion with respect to FIG. 7. However, it will be clear to those skilled in the art, after reading this disclosure, how to make and use alternative embodiments of the present invention in which another type of interprocess communication between telephony application 242 and signaling protocol stack 233 is used, such as, for example, and without limitation, writing to a shared file, writing to shared memory, etc.

At task 640, signaling protocol stack 233 transmits and receives, over telecommunications network 120, the Session Initiation Protocol (SIP) signaling necessary to change the state of the telecommunications session. It will be clear to those skilled in the art how to execute task 640.

At task 650, the telephone call media is encoded, decoded, and reproduced. In accordance with the illustrative embodiment of the present invention, hardware 210 detects that incoming voice packets are received from network 120. The received packets are placed in a buffer and decoded into raw audio data. The raw audio data is sent to the audio interface of terminal 110 for reproduction. In accordance with the illustrative embodiment of the present invention, the media decoding is accomplished by hardware 210. However, it will be clear to those skilled in the art, after reading this disclosure, how to make and use alternative embodiments of the present invention in which the encoding is performed by a coder-decoder program (a.k.a. codec) located in a higher software layer, such as, for example, and without limitation, virtualization layer 220 and system software 230. Furthermore, it will be clear to those skilled in the art, after reading this disclosure, how to make and use alternative embodiments of the present invention in which the encoding is performed by telephony application 232.

Specifically, in the illustrative embodiments of the present invention in which the decoding of the incoming voice packets is performed by a coder-decoder program (a.k.a. codec) located in system software 232, a second coder-decoder program (a.k.a. codec), running in system software 240 is started when system software 240 is switched to being the active software environment of terminal 110. The second coder-decoder program (a.k.a. codec) is configured to receive data from the buffer where the received packets are placed. And then, the second coder-decoder program (a.k.a. codec) is used to decode the media received by terminal 110.

FIG. 7 depicts a flowchart of the execution of the salient tasks involved in the remote execution of routines provided by the signaling protocol stack application programming interfaces. It will be clear to those skilled in the art, after reading this disclosure, how to perform the tasks associated with FIG. 7 in a different order than represented or to perform one or more of the tasks concurrently. Furthermore, it will be clear to those skilled in the art, after reading this disclosure, how to make and use alternative embodiments of the present invention that omit one or more of the tasks. Specifically, it will be clear to those skilled in the art, after reading this disclosure, how to make and use alternative embodiments of the present invention in which either, or all, of tasks 710, 725, 735, and 750, are omitted. And additionally, it should be noted that there are many ways to implement remote procedure calling and that the present invention is not limited in any way to the tasks depicted in FIG. 7.

At task 705, telephony application 242 remotely executes a routine that is provided by the signaling protocol stack 233 application programming interface (API). In doing so, telephony application generates a message which identifies the invoked routine and contains any parameters that are required by the invoked routine.

At task 710, translator 350 receives the message and translates the parameters contained in the message to a format that is compatible with translator 330. Additionally, translator 350 generates a message which identifies the invoked routine and contains the translated parameters, and, subsequently, translator 350 forwards the generated message to client-server 360. It will be clear to those skilled in the art, after reading this disclosure, how to make and use alternative embodiments of the present invention in which translator 350 translates the routine parameters to another format, such as, for example, and without limitation, a standard format (e.g. Microsoft's™ NDR format, etc.), a format compatible with signaling protocol stack 233, and so forth. Moreover, it will be clear to those skilled in the art, after reading this disclosure, how to make and use alternative embodiments of the present invention in which the identification of the invoked routine is also translated.

At task 715, client-server 360 receives the message containing the translated routine parameters, and, in a well known fashion, transmits the message, over telecommunications network 310, to client-server 340.

At task 720, client-server 340 receives the message transmitted at task 715 and forwards it to translator 330.

At task 725, translator 330 translates the routine parameters contained in the message received at task 720 to a format that is compatible with signaling protocol stack 233. Additionally, translator 330 forwards the translated parameters to signaling protocol stack 233 and causes signaling protocol stack 233 to execute the routine identified in the message. It will be clear to those skilled in the art, after reading this disclosure, how to make and use alternative embodiments of the present invention in which translator 350 translates the function parameters to a standard format, such as, for example, and without limitation, Microsoft's™ NDR format. Furthermore, it will be clear to those skilled in the art, after reading this disclosure, how to make and use alternative embodiments of the present invention in which the identification of the invoked procedure is also translated.

At task 730, signaling protocol stack 233 executes the routine identified in the translated message and produces a return value. Additionally, signaling protocol stack 233 generates a return message containing the return value and forwards the generated message to translator 330.

At task 735, translator 330 translates the return value, which is contained in the return message, to a form that is compatible with translator 350. Additionally, translator 330 generates a message which contains the translated return value and forwards it to client-server 340. It will be clear to those skilled in the art, after reading this disclosure, how to make and use alternative embodiments of the present invention in which translator 350 translates the return value to another format, such as, for example, and without limitation, a standard format, (e.g. Microsoft's™ NDR format), a format compatible with telephony application 242, and so forth.

At task 740, client-server 340 transmits the message containing the translated return value, over telecommunications network 310, to client-server 360.

At task 745, client-server 360 receives the message transmitted at task 740 and forwards it to translator 350.

At task 750, translator 350 translates the return value contained in the message received at task 745 to a form that is compatible with telephony application 242. Additionally, translator 350 forwards the translated return value to telephony application 242. It will be clear to those skilled in the art, after reading this disclosure, how to make and use alternative embodiments of the present invention in which translator 350 translates the return value into a standard form, such as, for example, and without limitation, Microsoft's™ NDR format.

Figure 8:
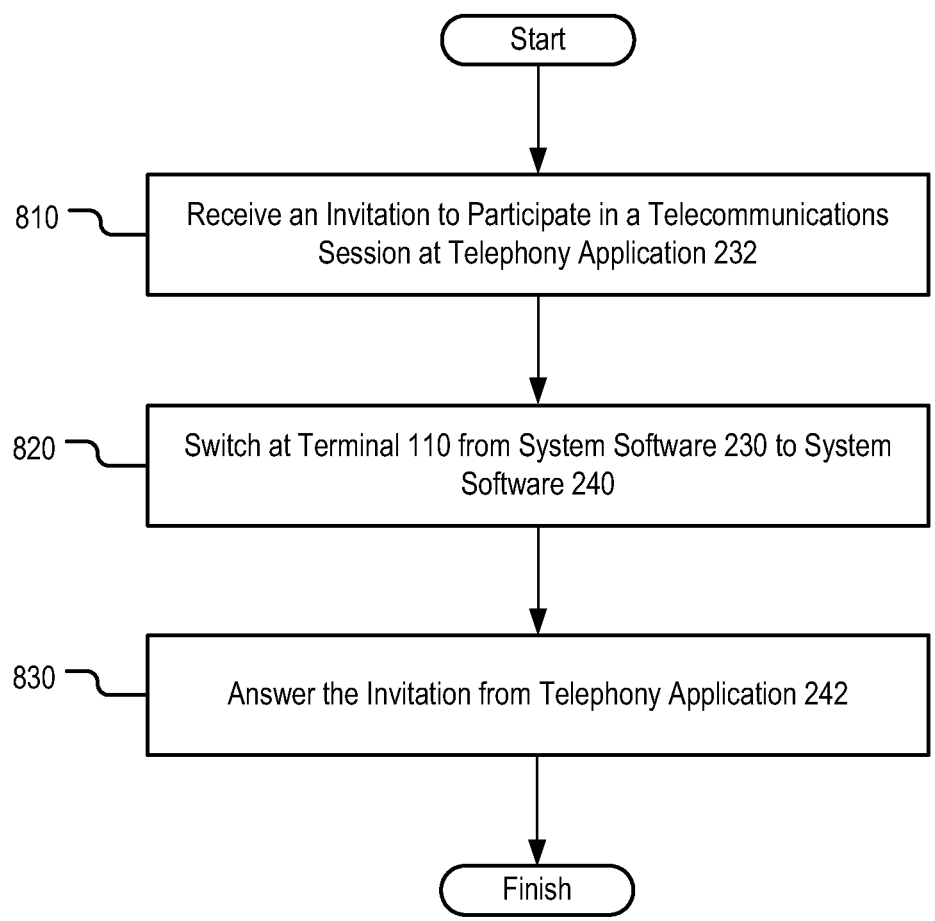
FIG. 8 depicts a flowchart of the salient tasks associated with the operation of another illustrative embodiment of the present invention.

FIG. 8 depicts a flowchart of the salient tasks associated with the operation of another illustrative embodiment of the present invention. It will be clear to those skilled in the art, after reading this disclosure, how to perform the tasks associated with FIG. 8 in a different order than represented or to perform one or more of the tasks concurrently. Furthermore, it will be clear to those skilled in the art, after reading this disclosure, how to make and use alternative embodiments of the present invention that omit one or more of the tasks.

At task 810, telephony application 232 receives an invitation to participate in a telecommunications session. In accordance with the illustrative embodiment of the present invention, telephony application 232 receives a session initiation protocol (SIP) INVITE message which indicates that there is an incoming telephone call. However, it will be clear to those skilled in the art, after reading this disclosure, how to make and use alternative embodiments of the present invention in which the telecommunications session for which telephony application 232 receives an invitation is any type of telecommunications session, such as, for example, and without limitation, video call, instant messaging session, etc.

At task 820, telecommunications terminal 110 switches to running system software 240 as its active software environment before the invitation has been answered. When system software 240 is made the active software environment, its user interface becomes visible on the display of terminal 110. Furthermore, those skilled in the art will recognize, after reading this disclosure, that in situations in which virtualization layer 220 runs on top of a native operating system, system software 240 will be an application executing in the native operating system instead of a separate software environment.

Correspondingly, it will be clear to those skilled in the art, after reading this disclosure, how to make and use alternative embodiments of the present invention in which, at task 230, telecommunications terminal 110 makes system software 240 the active window that is open in the native operating system.

At task 830, telephony application 242 answers the invitation to participate in the telecommunications session. Task 830 is described in further detail in the discussion with respect to FIG. 9.

Figure 9:
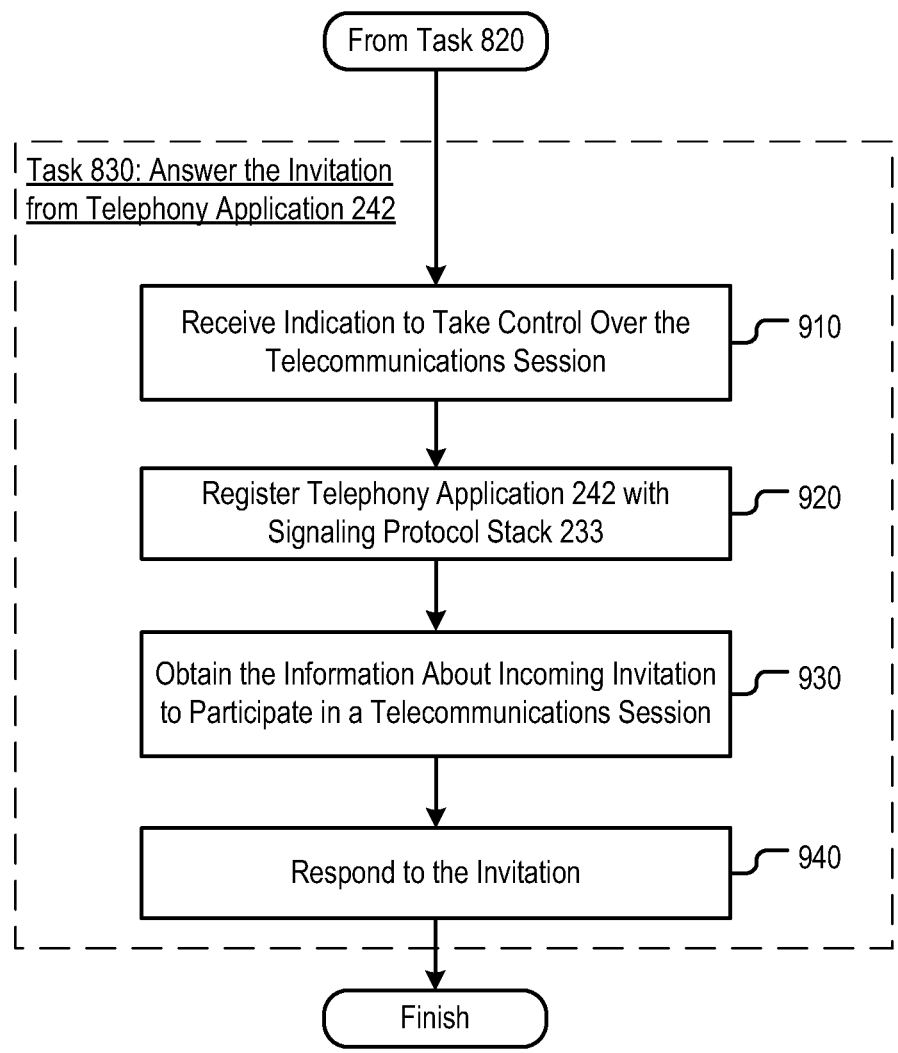
FIG. 9 depicts a flowchart of the execution of the salient subtasks associated with the performance of task 440.

FIG. 9 depicts a flowchart of the execution of the salient subtasks associated with the performance of task 830. It will be clear to those skilled in the art, after reading this disclosure, how to perform the tasks associated with FIG. 9 in a different order than represented or to perform one or more of the tasks concurrently. Furthermore, it will be clear to those skilled in the art, after reading this disclosure, how to make and use alternative embodiments of the present invention that omit one or more of the tasks.

At task 910, telephony application 242 receives an indication to take control over the telecommunications session. In accordance with the illustrative embodiment of the present invention, the indication is transmitted by system software 232, but it will be clear to those skilled in the art, after reading this disclosure, how to make and use alternative embodiments of the present invention in which the indication is transmitted by another component (e.g. telephony application 242, hardware layer 210, or virtualization layer 220, etc.). Furthermore, it will be clear to those skilled in the art, after reading this disclosure, how to make and use alternative embodiments of the present invention in which the indication is generated in response to the pressing of a button (either a physical switch or a graphical user interface component).

At task 920, telephony application 242 registers with signaling protocol stack 233 by remotely executing one or more of the routines provided by the signaling protocol stack 233 application programming interface (API). In accordance with the illustrative embodiment of the present invention, telephony application 242 submits application identification (ID) and/or identification of a callback function. However, it will be clear to those skilled in the art, after reading this disclosure, how to make and use alternative embodiments of the present invention in which additional information is submitted, such as, for example, and without limitation, information concerning the media capabilities of telephony application 242 (e.g. voice, text, video, etc.), type of connection, protocols supported, etc.).

In accordance with the illustrative embodiment of the present invention, telephony application 242 executes the routines provided by the signaling protocol stack 233 application programming interface (API) by using a remote procedure calling arrangement, such as the one described in the discussion with respect to FIG. 7. However, it will be clear to those skilled in the art, after reading this disclosure, how to make and use alternative embodiments of the present invention in which another type of interprocess communication between telephony application 242 and signaling protocol stack 233 is used, such as, for example, and without limitation, writing to a shared file, writing to shared memory, etc.

At task 930, telephony application 242 obtains information about the incoming invitation to participate in a telecommunication session. In accordance with the illustrative embodiment of the present invention, the information obtained comprises far-end party identification, media type of the telecommunications session (e.g. voice, video, etc.), etc. However, it will be clear to those skilled in the art, after reading this disclosure, how to make and use alternative embodiments of the present invention in which the information obtained comprises any item of information related to the invitation to participate in a telecommunications session, such as, for example, and without limitation, media capabilities of a far-end party (e.g. voice, video, text, etc.), authentication information (e.g. login name, password, type of encryption method used, etc.), personal information of a far-end party, etc.

In accordance with the illustrative embodiment of the present invention, telephony application 242 executes the routines provided by the signaling protocol stack 233 application programming interface (API) by using a remote procedure calling arrangement, such as the one described in the discussion with respect to FIG. 7. However, it will be clear to those skilled in the art, after reading this disclosure, how to make and use alternative embodiments of the present invention in which another type of interprocess communication between telephony application 242 and signaling protocol stack 233 is used, such as, for example, and without limitation, writing to a shared file, writing to shared memory, etc.

At task 940, telephony application 242 answers the invitation to participate in a telecommunication session by remotely executing one or more of the routines provided by the signaling protocol stack 233 application programming interface (API). The manner in which the remote procedure calls are executed is identical to the one described in the discussion with respect to FIG. 7. Although remote procedure calling is used in the illustrative embodiment of the present invention, it will be clear to those skilled in the art, after reading this disclosure, how to make and use alternative embodiments of the present invention in which another type of interprocess communication between telephony application 242 and signaling protocol stack 233 is used, such as, for example, and without limitation, writing to a shared file, writing to shared memory, etc.

Figure 10:
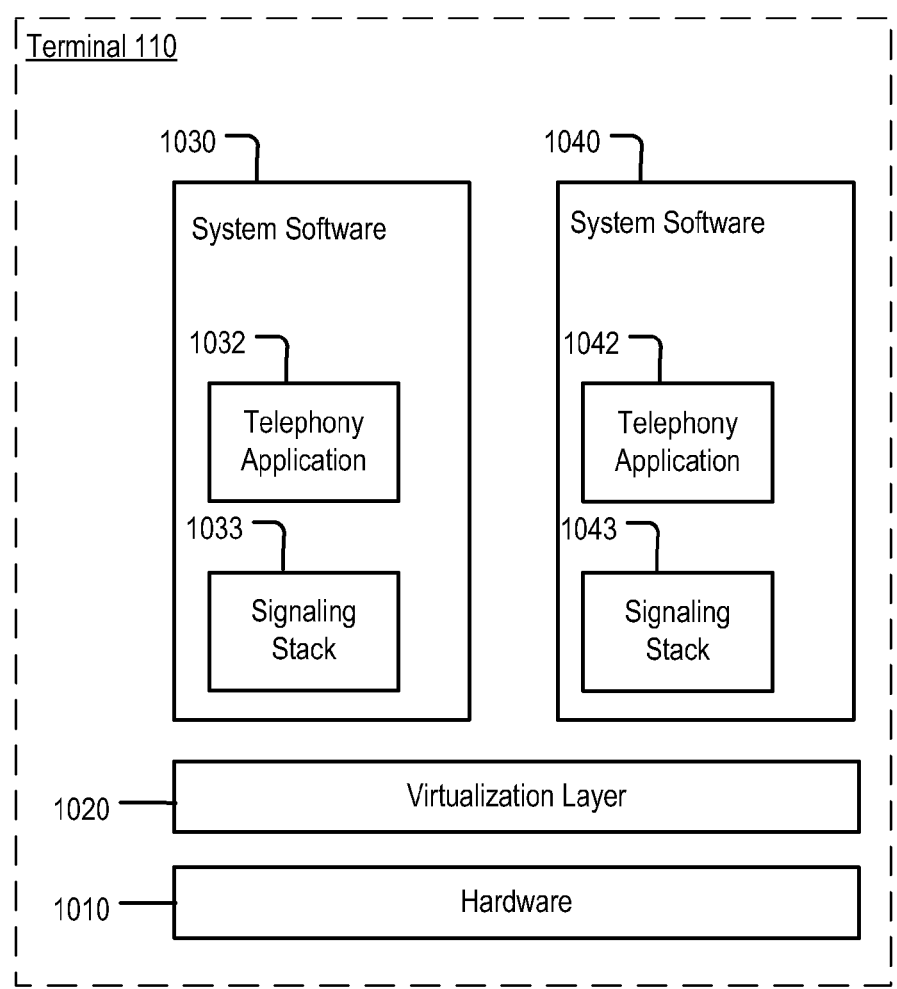
FIG. 10 depicts a schematic diagram of the salient components of another illustrative embodiment of the present invention.

FIG. 10 depicts a schematic diagram of the salient components of another illustrative embodiment of the present invention. The illustrative embodiment comprises system software 1030, system software image 1040, virtualization layer 1020, hardware 1010, telephony application 1032, telephony application 1042, signaling protocol stack 1033, and signaling protocol stack 1043.

Hardware 1010 is the electronic components that comprise terminal 110, such as, for example, and without limitation, processor (single-core or multi-core), memory, transceiver, network interface, display, sound interface, video interface, etc. Hardware 1010 is capable of executing system software and one or more telephony applications. It will be clear to those skilled in the art how to make and use hardware 1010.

Virtualization Layer 1020 is a software layer that facilitates the sharing of the resources of hardware 1010 by multiple system software images. In accordance with the illustrative embodiment of the present invention, virtualization layer 1020 is an OKL4 micro kernel, but it will be clear to those skilled in the art, after reading this disclosure, how to make and use alternative embodiments of the present invention in which virtualization layer 1020 is any other Type 1 hypervisor (e.g. Xen™, VMware ESX Server™, etc.) or any other hosted virtual machine (e.g. QEMU™, VMware Workstation™, etc.).

System software 1030 is an image of the Android™ operating system that is running on top of virtualization layer 1020. It will be clear to those skilled in the art, after reading this disclosure, how to make and use alternative embodiments of the present invention in which system software 1030 is any type of system software, firmware, or software platform that is capable of executing one or more software applications, such as, for example, and without limitation, Nokia Series 40 Platform™, Nokia Series 60 Platform™, Symbian OS™, Linux, BlackBerry OS™, etc. In accordance with the illustrative embodiment of the present invention, both telephony application 1032 and signaling protocol stack 1033 are executing on system software 1030.

Signaling protocol stack 1033 is a Session Initiation Protocol (SIP) stack. Signaling protocol stack 1033 provides telephony application 1032 with an application programming interface (API) for the creating, transmitting, and receiving of Session Initiation Protocol (SIP) messages. Moreover, signaling protocol stack 1033 is also capable of maintaining records of information about the state of a telecommunications session, such as, for example, and without limitation, callback function (or listener) registration, far-end party addresses, application identification numbers, etc. Signaling protocol stack 1033 provides application programming interface (API) routines which allow other programs to request and obtain state information about ongoing telecommunications sessions.

Although, in accordance with the illustrative embodiment of the present invention, signaling protocol stack 1033 uses the Session Initiation Protocol (SIP), it will be clear to those skilled in the art, after reading this disclosure, how to make and use alternative embodiments of the present invention in which signaling protocol stack 1033 uses any other communications protocol, such as, for example, and without limitation, H.323, P2P-SIP, Skype™, and others. Furthermore, in accordance with the illustrative embodiment of the present invention, signaling protocol stack 1033 is running on system software 1030, but it will be clear to those skilled in the art, after reading this disclosure, how to make and use alternative embodiments of the present invention in which signaling protocol stack 1033 is running on virtualization layer 1020 or system software that is host to virtualization layer 1020.

Telephony application 1032 is a software application for conducting telephone conversations. Telephony application 1032 is capable of reading and processing messages received from signaling protocol stack 1033, reading and processing data structures and variables indicated by the messages, as well as executing callback functions identified by the messages. It will be clear to those skilled in the art, after reading this disclosure, how to make and use alternative embodiments of the present invention in which telephony application 1032 is any type of telecommunications application (e.g. instant messenger, video phone, audio enabled instant messenger, Skype™, Google Talk™, Yahoo Instant Messenger™, etc.).

System software 1040 is an image of the Symbian™ operating system that is running on top of virtualization layer 1020 concurrently with system software 1030. It will be clear to those skilled in the art, after reading this disclosure, how to make and use alternative embodiments of the present invention in which system software 1030 is any type of system software, firmware, or software platform that is capable of executing one or more software applications, such as, for example, and without limitation Nokia Series 40 Platform™, Nokia Series 60 Platform™, Symbian OS™, Linux, BlackBerry OS™, etc. In accordance with the illustrative embodiment of the present invention, telephony application 1042 and signaling protocol stack 1043 are executing on system software 1040.

Telephony application 1042 is a software application for conducting telephone conversations. Telephony application 1042 is capable of reading and processing messages received from signaling protocol stack 1043, reading and processing data structures and variables indicated by the messages, as well as executing callback functions identified by the messages. In accordance with the illustrative embodiment of the present invention, telephony application 1042 is different software from telephony application 1032, however, it will be clear to those skilled in the art, after reading this disclosure, how to make and use alternative embodiments of the present invention in which telephony applications 1032 and 1042 are different instances of the same software. It will be clear to those skilled in the art, after reading this disclosure, how to make and use alternative embodiments of the present invention in which telephony application 1042 is any type of telecommunications application (e.g. instant messenger, video phone, audio enabled instant messenger, Skype™, Google Talk™, Yahoo Instant Messenger™, etc.).

Signaling protocol stack 1043 is a Session Initiation Protocol (SIP) stack. Signaling protocol stack 1043 provides telephony application 1042 with an application programming interface (API) for the creating, transmitting, and receiving of Session Initiation Protocol (SIP) messages. Moreover, signaling protocol stack 1043 is also capable of maintaining records of information about the state of a telecommunications session, such as, for example, and without limitation, callback function (or listener) registration, far-end party addresses, application identification numbers, etc. Signaling protocol stack 1043 provides application programming interface (API) routines which allow other programs to request and obtain state information about ongoing telecommunications sessions from signaling protocol stack 1033. Furthermore, signaling protocol stack 1043 provides application programming interface (API) routines which allow other programs to request and obtain state information about incoming telecommunications session invitations from signaling protocol stack 1033.

Although, in accordance with the illustrative embodiment of the present invention, signaling protocol stack 1043 uses the Session Initiation Protocol (SIP), it will be clear to those skilled in the art, after reading this disclosure, how to make and use alternative embodiments of the present invention in which signaling protocol stack 1043 uses any other communications protocol, such as, for example, and without limitation, H.323, P2P-SIP, Skype™, and others. Furthermore, in accordance with the illustrative embodiment of the present invention, signaling protocol stack 1043 is running on system software 1040, but it will be clear to those skilled in the art, after reading this disclosure, how to make and use alternative embodiments of the present invention in which signaling protocol stack 1043 is running on virtualization layer 1020 or system software that is host to virtualization layer 1020.

Figure 11:
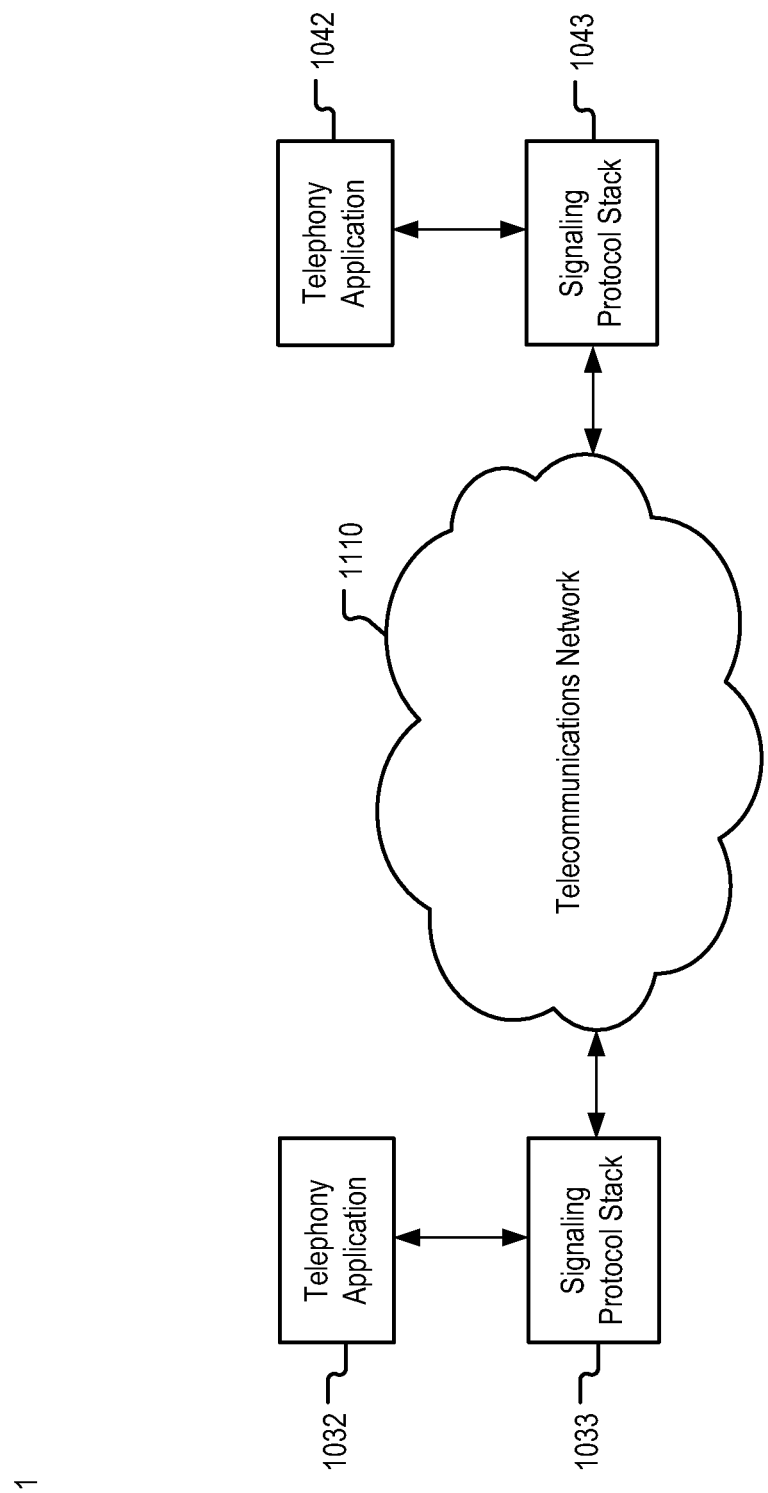
FIG. 11 depicts a schematic diagram of the salient components of the illustrative embodiment of the present invention.

FIG. 11 depicts a schematic diagram of the salient components of the illustrative embodiment of the present invention. The illustrative embodiment comprises telephony application 1032, signaling protocol stack 1033, telephony application 1042, and signaling protocol stack 1043.

Telecommunications network 1110 transports messages between signaling protocol stack 1033 and 1043. In accordance with the illustrative embodiment of the present invention, telecommunications network 1110 is the Internet, but it will be clear to those skilled in the art, after reading this disclosure, how to make and use alternative embodiments of the present invention in which telecommunications network 1110 is any type of telecommunications network (e.g. local area network, the Public Switched Telephone Network, SONET, ATM, cellular network, etc.). Furthermore, in accordance with the illustrative embodiment of the present invention, telecommunications network 1110 is the same entity as telecommunications network 120, but it will be clear to those skilled in the art, after reading this disclosure, how to make and use alternative embodiments of the present invention in which telecommunications network 1110 and telecommunications network 120 are different entities.

Figure 12:
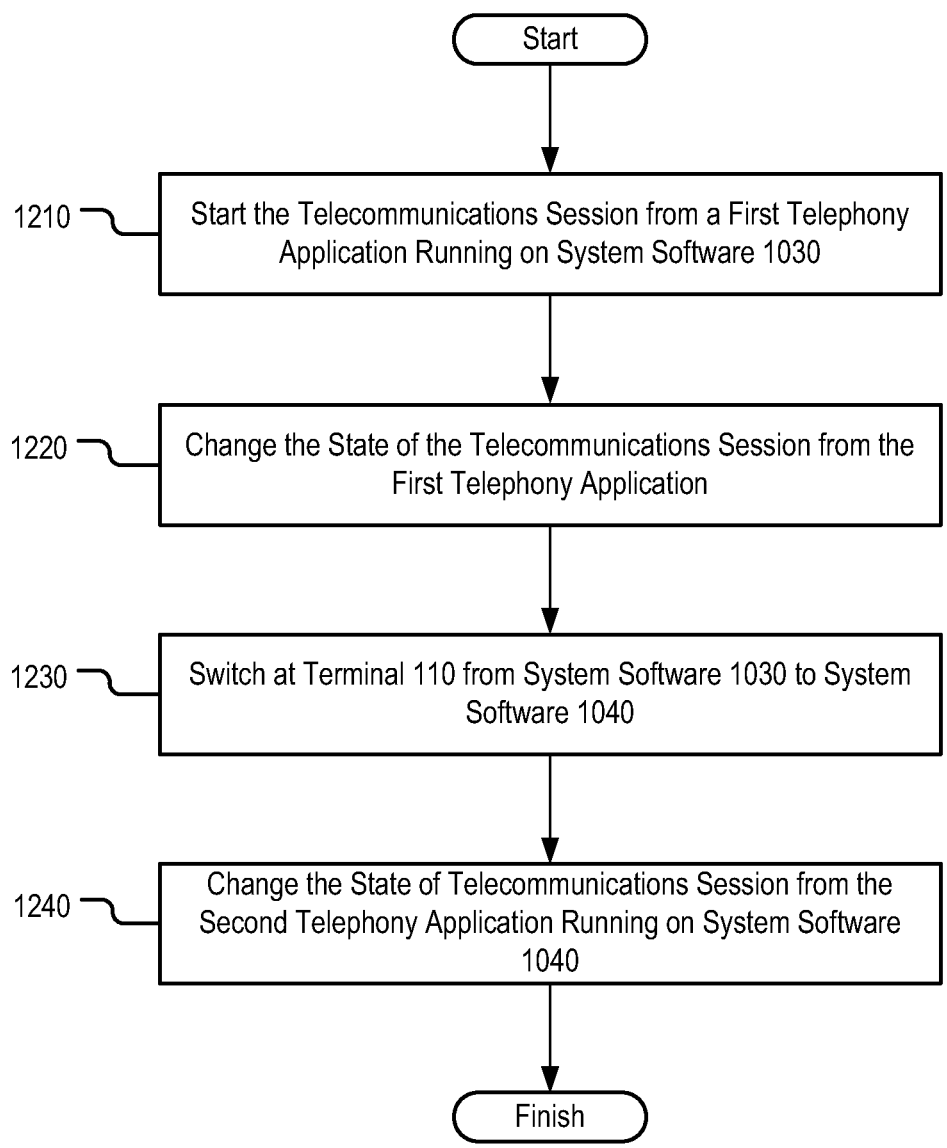
FIG. 12 depicts a flowchart of the execution of the salient tasks associated with the operation of the illustrative embodiment of the present invention.

FIG. 12 depicts a flowchart of the execution of the salient tasks associated with the operation of the illustrative embodiment of the present invention. It will be clear to those skilled in the art, after reading this disclosure, how to perform the tasks associated with FIG. 12 in a different order than represented or to perform one or more of the tasks concurrently. Furthermore, it will be clear to those skilled in the art, after reading this disclosure, how to make and use alternative embodiments of the present invention that omit one or more of the tasks.

At task 1210, telephony application 1032 initiates a telecommunications session with user 140-3. Task 1210 is further described in the discussion with respect to FIG. 13.

At task 1220, telephony application 1032 changes the state of the telecommunications session initiated at task 1010. In accordance with the illustrative embodiment of the present invention, telephony application 1032 joins user 140-1 to the telecommunications session. The change of state is effectuated through the calling of one or more routines provided by the signaling protocol stack 1033 application programming interface (API). Those skilled in the art will recognize, after reading this disclosure, how to make and use alternative embodiments of the present invention in which the change of state is any change of state permitted by the telecommunications protocol used for the telecommunications session.

At task 1230, telecommunications terminal 110 switches to running system software 1040 as its active software environment. When system software 1040 is made the active software environment, its user interface becomes visible on the display of terminal 110. Furthermore, those skilled in the art will recognize, after reading this disclosure, that in situations in which virtualization layer 1020 runs on top of a native operating system, system software 1040 will be an application executing in the native operating system instead of a separate software environment. Correspondingly, it will be clear to those skilled in the art, after reading this disclosure, how to make and use alternative embodiments of the present invention in which, at task 1030, telecommunications terminal 110 makes system software 1040 the active window that is open in the native operating system.

At task 1240, telephony application 1042 changes the state of the telecommunications session. In accordance with the illustrative embodiment of the present invention, telephony application 1042 joins user 140-2 to the telecommunications session, but it will be clear to those skilled in the art, after reading this disclosure, how to make and use alternative embodiments of the present invention in which the change of the state is any change of state permitted by the telecommunications protocol used. The execution of task 1140 is described in further detail in the discussions with respect to FIG. 14.

Figure 13:
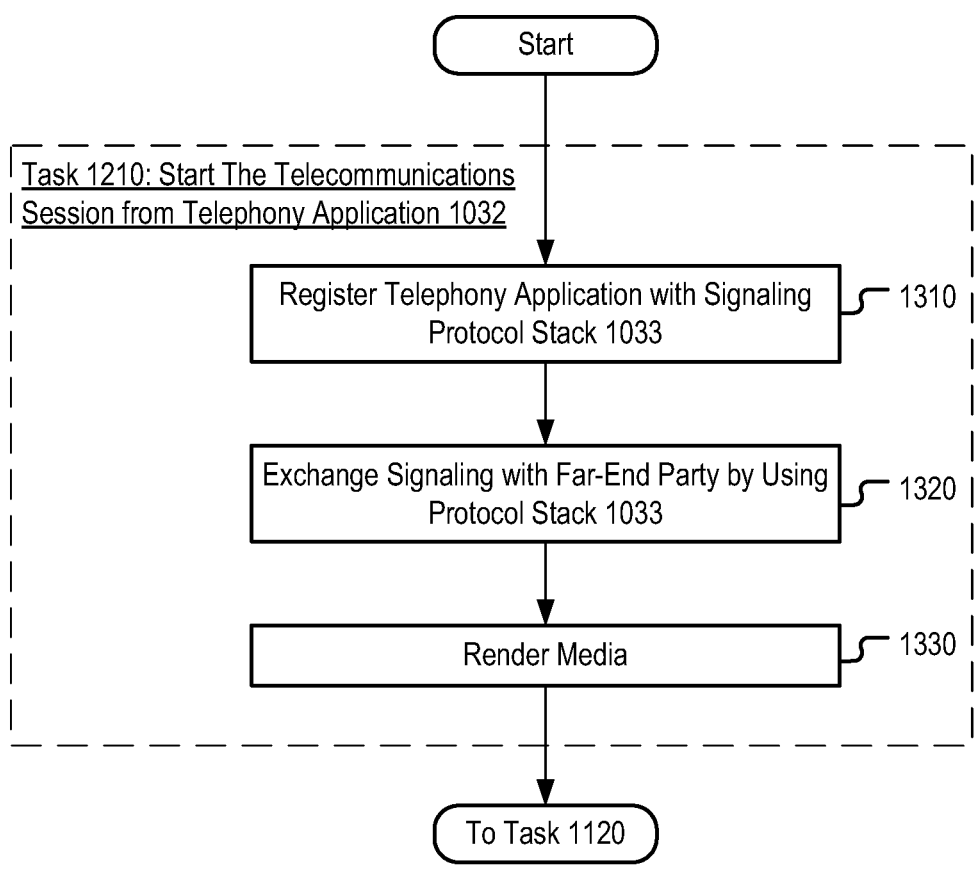
FIG. 13 depicts a flowchart of the execution of the salient subtasks associated with the performance of task 1220.

FIG. 13 depicts a flowchart of the execution of the salient subtasks associated with the performance of task 1210. It will be clear to those skilled in the art, after reading this disclosure, how to perform the tasks associated with FIG. 13 in a different order than represented or to perform one or more of the tasks concurrently. Furthermore, it will be clear to those skilled in the art, after reading this disclosure, how to make and use alternative embodiments of the present invention that omit one or more of the tasks.

At task 1310, telephony application 1032 registers with signaling protocol stack 1033 by calling one or more of the routines provided by the signaling protocol stack 1033 application programming interface (API). In accordance with the illustrative embodiment of the present invention, telephony application 1032 submits an application identification and/or identification of at least one callback function. However, it will be clear to those skilled in the art, after reading this disclosure, how to make and use alternative embodiments of the present invention in which additional information is submitted, such as, for example, and without limitation, information concerning the media capabilities of telephony application 1032 (e.g. voice, text, video, etc.), type of connection, protocols supported, etc. In accordance with the illustrative embodiment of the present invention, telephony application 1032 executes the routines directly.

At task 1320, signaling protocol stack 1033 transmits and receives, over telecommunications network 120, the Session Initiation Protocol (SIP) signaling necessary to change the state of the telecommunications session. It will be clear to those skilled in the art how to execute task 1320.

At task 1330, the telephone call media is encoded, decoded, and reproduced. In accordance with the illustrative embodiment of the present invention, hardware 1010 detects that incoming voice packets are received from network 120. The received packets are placed in a buffer and decoded into raw audio data. The raw audio data is sent to the audio interface of terminal 110 for reproduction. In accordance with the illustrative embodiment of the present invention, the media decoding is accomplished by hardware 1010, but it will be clear to those skilled in the art, after reading this disclosure, how to make and use alternative embodiments of the present invention in which the encoding is performed by a coder-decoder program (a.k.a. codec) located in a higher software layer, such as, for example, and without limitation, virtualization layer 1020 and system software 1030. Furthermore, it will be clear to those skilled in the art, after reading this disclosure, how to make and use alternative embodiments of the present invention in which the encoding is performed by telephony application 1032.

Figure 14:
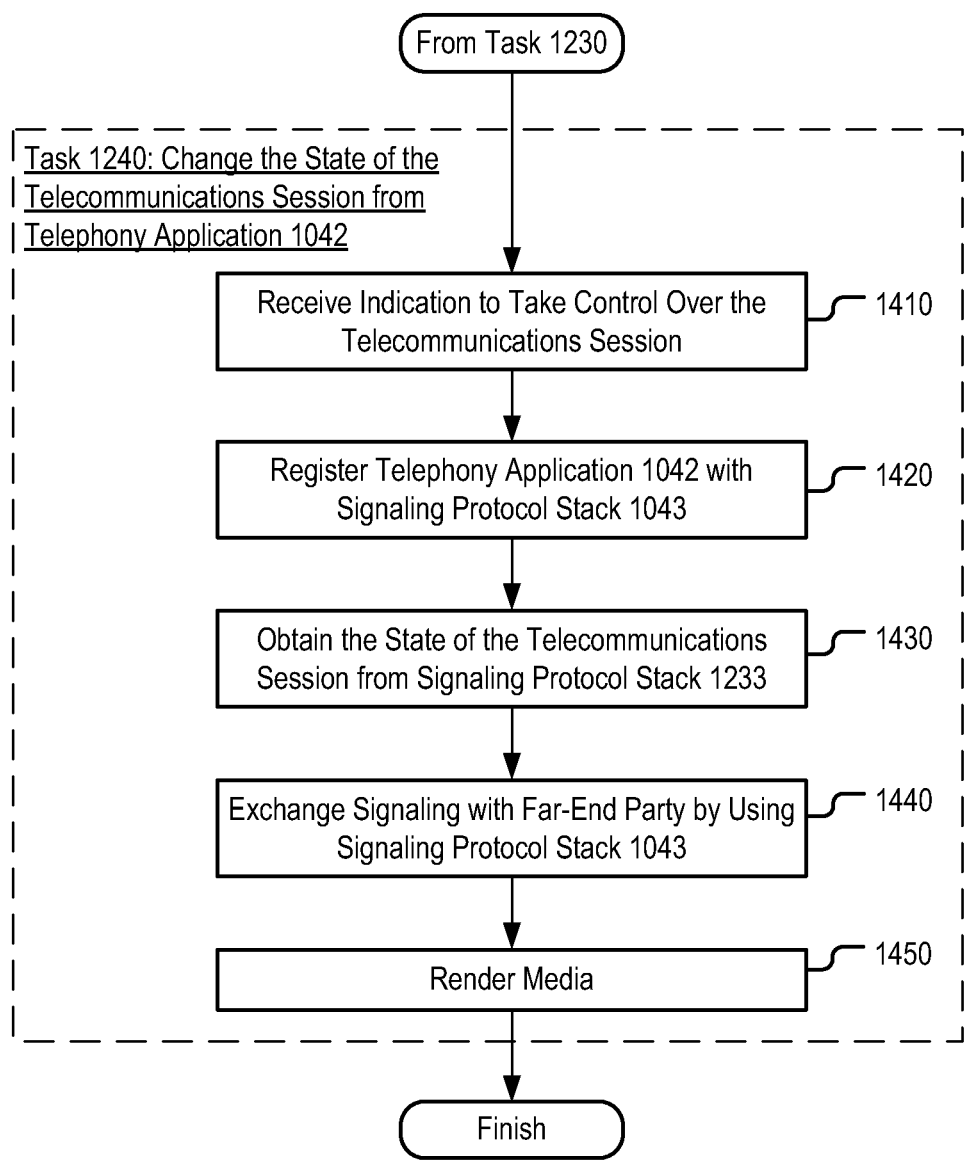
FIG. 14 depicts a flowchart of the execution of the salient subtasks associated with the performance of task 1240.

FIG. 14 depicts a flowchart of the execution of the salient subtasks associated with the performance of task 1240. It will be clear to those skilled in the art, after reading this disclosure, how to perform the tasks associated with FIG. 14 in a different order than represented or to perform one or more of the tasks concurrently. Furthermore, it will be clear to those skilled in the art, after reading this disclosure, how to make and use alternative embodiments of the present invention that omit one or more of the tasks.

At task 1410, telephony application 1033 receives an indication to take control over the telecommunications session. In accordance with the illustrative embodiment of the present invention, the indication is transmitted by system software 1030, but it will be clear to those skilled in the art, after reading this disclosure, how to make and use alternative embodiments of the present invention in which the indication is transmitted by another component (e.g. telephony application 1042, by hardware layer 1010, or by virtualization layer 1010, etc.). Furthermore, it will be clear to those skilled in the art, after reading this disclosure, how to make and use alternative embodiments of the present invention in which the indication is generated in response to the pressing of a button (either are a physical switch or a graphical user interface component).

At task 1420, telephony application 1042 registers with signaling protocol stack 1033 by calling one or more of the routines provided by the signaling protocol stack 1043 application programming interface (API). In accordance with the illustrative embodiment of the present invention, telephony application 1042 submits an application identification and/or identification of at least one callback function. However, it will be clear to those skilled in the art, after reading this disclosure, how to make and use alternative embodiments of the present invention in which additional information is submitted, such as, for example, and without limitation, information concerning the media capabilities of telecommunications terminal 110 (e.g. voice, text, video, etc.), type of connection, protocols supported, etc. In accordance with the illustrative embodiment of the present invention, telephony application 1042 executes the routines provided by the signaling protocol stack 1043 application programming interface (API) directly.

At task 1430, signaling protocol stack 1043 obtains information about the state of the telecommunications session from signaling protocol stack 1033 by remotely executing one or more of the routines provided by the signaling protocol stack 1033 application programming interface (API). When the state information is received by signaling protocol stack 1043, the state of signaling protocol stack 1043 is sufficiently synchronized with the state of signaling protocol stack 1033 as to enable telephony application 1042 to control the telecommunications session trough signaling protocol stack 1043 in a similar fashion as telephony application 1032 controls the telecommunications session through signaling protocol stack 1033 when system software 1030 is the active software environment on terminal 110.

In accordance with the illustrative embodiment of the present invention, the state information comprises far-end party identification, media type of the telecommunications session (e.g. voice, video, etc.), names of call-back functions registered with SIP stack 233, etc. However, it will be clear to those skilled in the art, after reading this disclosure, how to make and use alternative embodiments of the present invention in which the state information comprises any item of information related to the telecommunications session, such as, for example, and without limitation, media capabilities of a far-end party (e.g. voice, video, text, etc.), authentication information (e.g. login name, password, type of encryption method used, etc.), personal information of a far-end party, etc.

Furthermore, in accordance with the illustrative embodiment of the present invention, telephony application 1042 executes the routines provided by the signaling protocol stack 1033 application programming interface (API) by using a remote procedure calling arrangement, such as the one described in the discussion with respect to FIG. 7. However, it will be clear to those skilled in the art, after reading this disclosure, how to make and use alternative embodiments of the present invention in which another type of interprocess communication between signaling protocol stack 1033 and signaling protocol stack 1043 is used, such as, for example, and without limitation, writing to a shared file, writing to shared memory, etc.

At task 1440, signaling protocol stack 1033 transmits and receives the Session Initiation Protocol (SIP) signaling necessary change the state of the telecommunications session. It will be clear to those skilled in the art how to execute task 1440.

At task 1450, the telephone call media is encoded, decoded, and reproduced. In accordance with the illustrative embodiment of the present invention, hardware 1010 detects that incoming voice packets are received from network 120. The received packets are placed in a buffer and decoded into raw audio data. The raw audio data is sent to the audio interface of terminal 110 for reproduction. In accordance with the illustrative embodiment of the present invention, the media decoding is accomplished by hardware 1010. However, it will be clear to those skilled in the art, after reading this disclosure, how to make and use alternative embodiments of the present invention in which the encoding is performed by a coder-decoder program (a.k.a. codec) located in a higher software layer, such as, for example, and without limitation, virtualization layer 1020 and system software 1030. Furthermore, it will be clear to those skilled in the art, after reading this disclosure, how to make and use alternative embodiments of the present invention in which the encoding is performed by telephony application 1032.

Specifically, in the illustrative embodiments of the present invention in which the decoding of the incoming voice packets is performed by a coder-decoder program (a.k.a. codec) located in system software 1030, a second coder-decoder program (a.k.a. codec), running in system software 1040 is started when system software 1040 is switched to being the active software environment of terminal 110. The second coder-decoder program (a.k.a. codec) is configured to receive data from the buffer where the received packets are placed. And then, the second coder-decoder program (a.k.a. codec) is used to decode the media received by terminal 110.

Figure 15:
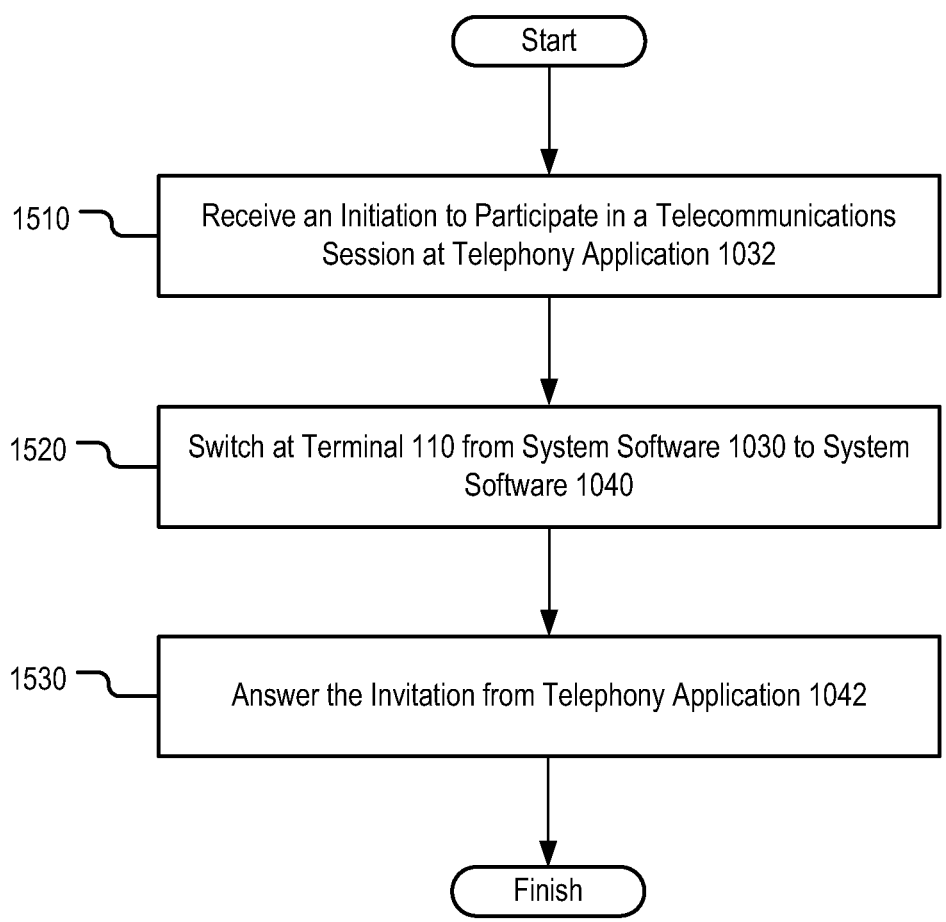
FIG. 15 depicts a flowchart of the salient tasks associated with the operation of another illustrative embodiment of the present invention.

FIG. 15 depicts a flowchart of the salient tasks associated with the operation of another illustrative embodiment of the present invention. It will be clear to those skilled in the art, after reading this disclosure, how to perform the tasks associated with FIG. 15 in a different order than represented or to perform one or more of the tasks concurrently. Furthermore, it will be clear to those skilled in the art, after reading this disclosure, how to make and use alternative embodiments of the present invention that omit one or more of the tasks.

At task 1510, telephony application 1032 receives an invitation to participate in a telecommunications session. In accordance with the illustrative embodiment of the present invention, telephony application 1032 receives a session initiation protocol (SIP) INVITE message which indicates that there is an incoming telephone call. However, it will be clear to those skilled in the art, after reading this disclosure, how to make and use alternative embodiments of the present invention in which the telecommunications session for which telephony application 1032 receives invitation is any type of telecommunications session, such as, for example, and without limitation, video call, instant messaging session, etc.

At task 1520, telecommunications terminal 110 switches to running system software 1040 as its active software environment before the invitation has been answered. When system software 1040 is made the active software environment, its user interface becomes visible on the display of terminal 110. Furthermore, those skilled in the art will recognize, after reading this disclosure, that in situations in which virtualization layer 1020 runs on top of a native operating system, system software 1040 will be an application executing in the native operating system instead of a separate software environment. Correspondingly, it will be clear to those skilled in the art, after reading this disclosure, how to make and use alternative embodiments of the present invention in which, at task 1520, telecommunications terminal 110 makes system software 1040 the active window that is open in the native operating system.

At task 1530, telephony application 1042 answers the invitation to participate in the telecommunications session. Task 1530 is described in further detail in the discussion with respect to FIG. 16.

Figure 16:
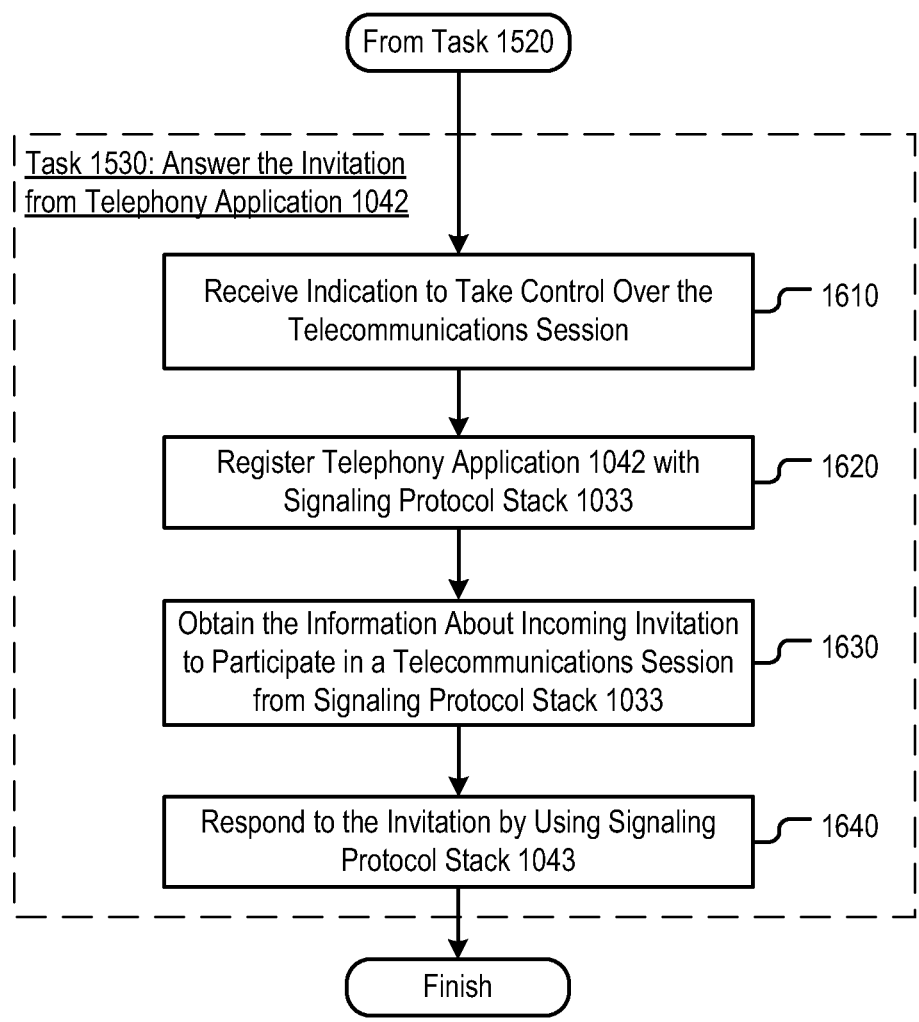
FIG. 16 depicts a flowchart of the execution of the salient subtasks associated with the performance of task 1530.

FIG. 16 depicts a flowchart of the execution of the salient subtasks associated with the performance of task 1530. It will be clear to those skilled in the art, after reading this disclosure, how to perform the tasks associated with FIG. 16 in a different order than represented or to perform one or more of the tasks concurrently. Furthermore, it will be clear to those skilled in the art, after reading this disclosure, how to make and use alternative embodiments of the present invention that omit one or more of the tasks.

At task 1610, telephony application 1042 receives an indication to take control over the telecommunications session. In accordance with the illustrative embodiment of the present invention, the indication is transmitted by system software 1032, but it will be clear to those skilled in the art, after reading this disclosure, how to make and use alternative embodiments of the present invention in which the indication is transmitted by another component (e.g. telephony application 1042, hardware layer 1010, or virtualization layer 1020, etc.). Furthermore, it will be clear to those skilled in the art, after reading this disclosure, how to make and use alternative embodiments of the present invention in which the indication is generated in response to the pressing of a button (either a physical switch or a graphical user interface component).

At task 1620, telephony application 1042 registers with signaling protocol stack 1043 by calling one or more of the routines provided by the signaling protocol stack 1043 application programming interface (API). In accordance with the illustrative embodiment of the present invention, telephony application 1042 submits an application identification and/or identification of at least one callback function. However, it will be clear to those skilled in the art, after reading this disclosure, how to make and use alternative embodiments of the present invention in which additional information is submitted, such as, for example, and without limitation, information concerning the media capabilities of telephony application 1042 (e.g. voice, text, video, etc.), type of connection, protocols supported, etc. In accordance with the illustrative embodiment of the present invention, telephony application 1042 executes the routines provided by the signaling protocol stack 1043 application programming interface (API) directly.

At task 1630, signaling protocol stack 1043 obtains information about the incoming invitation to participate in a telecommunication session. When the state information is received by signaling protocol stack 1043, the state of signaling protocol stack 1043 is sufficiently synchronized with the state of signaling protocol stack 1033 as to enable telephony application 1042 to answer telecommunications session invitation trough signaling protocol stack 1043 in a similar fashion as telephony application 1032 would answer the invitation through signaling protocol stack 1033 when system software 1030 is the active software environment on terminal 110.

In accordance with the illustrative embodiment of the present invention, the information obtained comprises far-end party identification, media type of the telecommunications session (e.g. voice, video, etc.), etc. However, it will be clear to those skilled in the art, after reading this disclosure, how to make and use alternative embodiments of the present invention in which the information obtained comprises any item of information related to the invitation to participate in a telecommunications session, such as, for example, and without limitation, media capabilities of a far-end party (e.g. voice, video, text, etc.), authentication information (e.g. login name, password, type of encryption method used, etc.), personal information of a far-end party, etc.

Furthermore, in accordance with the illustrative embodiment of the present invention, signaling protocol stack 1043 executes the routines provided by the signaling protocol stack 1033 application programming interface (API) by using a remote procedure calling arrangement, such as the one described in the discussion with respect to FIG. 7. However, it will be clear to those skilled in the art, after reading this disclosure, how to make and use alternative embodiments of the present invention in which another type of interprocess communication between signaling protocol stack 1033 and signaling protocol stack 1043 is used, such as, for example, and without limitation, writing to a shared file, writing to shared memory, etc.

At task 1640, telephony application 1042 answers the invitation to participate in a telecommunication session by directly executing one or more of the routines provided by the signaling protocol stack 1043 application programming interface (API). It will be clear to those skilled in the art how to execute task 1640.

It is to be understood that the disclosure teaches just examples of the illustrative embodiments and that many variations of the invention can easily be devised by those skilled in the art after reading this disclosure and that the scope of the present invention is to be determined by the following claims.

What is claimed is:

1. A method comprising:
changing a current communications protocol state of a communications session from a first communications protocol state to a second communications protocol state with a first telephony application running on a first system software environment at a terminal, wherein the current communications protocol state is changed by the first telephony application directly executing a first routine provided by a shared signaling protocol stack running on a virtualization layer at the terminal, and wherein the first system software environment and the second system software environment are both running on a same system software environment; and
changing the current communications protocol state of the communications session from the second communications protocol state to a third communications protocol state with a second telephony application running on a second system software environment at the terminal, wherein the current communications protocol state is changed by the second telephony application directly executing a second routine provided by the shared signaling protocol stack running on the terminal, and wherein the shared signaling protocol stack is shared by the first system software environment and the second system software environment.

2. The method of claim 1, further comprising switching the second system software environment as an active system software environment of the terminal in response to a receipt of user input.

3. The method of claim 1, wherein the shared signaling protocol stack and the second telephony application communicate via a telecommunications network.

4. The method of claim 1, wherein the second telephony application changes the current communications protocol state of the communications session by remotely executing a routine provided by the shared signaling protocol stack.

5. The method of claim 1, wherein the shared signaling protocols stack is running on the first system software environment at the terminal.

6. The method of claim 1, wherein the shared signaling protocol stack is running on the second system software environment at the terminal.

7. The method of claim 1, wherein the shared signaling protocol stack is a session initiation protocol stack.

8. A system comprising:
a processor; and
a non-transitory computer-readable storage medium storing instructions which, when executed by the processor, cause the processor to perform operations comprising:

changing a current communications protocol state of a communications session from a first communications protocol state to a second communications protocol state with a first telephony application running on a first system software environment at a terminal, wherein the current communications protocol state is changed by the first telephony application directly executing a first routine provided by a shared signaling protocol stack running on a virtualization layer at the terminal, and wherein the first system software environment and the second system software environment are both running on a same system software environment; and changing the current communications protocol state of the communications session from the second communications protocol state to a third communications protocol state with a second telephony application running on a second system software environment at the terminal, wherein the current communications protocol state is changed by the second telephony application directly executing a second routine provided by the shared signaling protocol stack running on the terminal.

9. The system of claim 8, further comprising switching the second system software environment as an active system software environment of the terminal in response to a receipt of user input.

10. The system of claim 8, wherein the shared signaling protocol stack and the second telephony application communicate via a telecommunications network.

11. The system of claim 8, wherein the second telephony application changes the current communications protocol state of the communications session by remotely executing a routine provided by the shared signaling protocol stack.

12. The system of claim 8, wherein the shared signaling protocols stack is running on one of the first system software environment and the second system software environment.

13. A non-transitory computer-readable storage device storing instructions which, when executed by a processor, cause the processor to perform operations comprising:

changing a current communications protocol state of a communications session from a first communications protocol state to a second communications protocol state with a first telephony application running on a first system software environment at a terminal, wherein the current communications protocol state is changed by the first telephony application directly executing a first routine provided by a shared signaling protocol stack running on a virtualization layer at the terminal, and wherein the first system software environment and the second system software environment are both running on a same system software environment; and changing the current communications protocol state of the communications session from the second communications protocol state to a third communications protocol state with a second telephony application running on a second system software environment at the terminal, wherein the current communications protocol state is changed by the second telephony application directly executing a second routine provided by the shared signaling protocol stack running on the terminal.

14. The non-transitory computer-readable storage device of claim 13, further comprising switching the second system software environment as an active system software environment of the terminal in response to a receipt of user input.

15. The non-transitory computer-readable storage device of claim 13, wherein the shared signaling protocol stack and the second telephony application communicate via a telecommunications network.

16. The non-transitory computer-readable storage device of claim 13, wherein the second telephony application changes the current communications protocol state of the communications session by remotely executing a routine provided by the shared signaling protocol stack.

17. The non-transitory computer-readable storage device of claim 13, wherein the shared signaling protocols stack is running on one of the first system software environment and the second system software environment.

* * * * *